United States Patent
Zhamu et al.

(10) Patent No.: US 7,745,047 B2
(45) Date of Patent: Jun. 29, 2010

(54) NANO GRAPHENE PLATELET-BASE COMPOSITE ANODE COMPOSITIONS FOR LITHIUM ION BATTERIES

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 255 days.

(21) Appl. No.: 11/982,672

(22) Filed: Nov. 5, 2007

(65) Prior Publication Data
US 2009/0117467 A1    May 7, 2009

(51) Int. Cl.
*H01M 4/58* (2010.01)
*H01M 4/40* (2006.01)
*H01M 10/24* (2006.01)
*H01G 9/00* (2006.01)

(52) U.S. Cl. ............. 429/231.8; 429/231.1; 429/231.95; 429/217; 429/221; 429/222; 361/502; 361/503

(58) Field of Classification Search ......... 429/100–300, 429/231.1–231.95
See application file for complete search history.

(56) References Cited

U.S. PATENT DOCUMENTS

| | | | |
|---|---|---|---|
| 5,344,726 A | 9/1994 | Tanaka et al. | |
| 5,635,151 A | 6/1997 | Zhang et al. | |
| 5,908,715 A | 6/1999 | Liu et al. | |
| 5,965,296 A | 10/1999 | Nishimura et al. | |
| 6,007,945 A | 12/1999 | Jacobs et al. | |
| 6,040,092 A | 3/2000 | Yamada et al. | |
| 6,087,043 A | 7/2000 | Tossici et al. | |
| 6,103,393 A | 8/2000 | Kodas et al. | |
| 6,143,448 A | 11/2000 | Fauteux et al. | |
| 6,316,143 B1 | 11/2001 | Foster et al. | |
| 6,524,744 B1 | 2/2003 | Clerc et al. | |
| 6,555,271 B1 | 4/2003 | Greinke et al. | |
| 6,596,396 B2 | 7/2003 | Hirata et al. | |
| 6,872,330 B2 | 3/2005 | Mack et al. | |
| 7,094,499 B1 | 8/2006 | Hung | |
| 7,105,108 B2 | 9/2006 | Kaschak et al. | |
| 7,157,517 B2 | 1/2007 | Gulari et al. | |
| 7,623,340 B1* | 11/2009 | Song et al. .................. | 361/502 |
| 2005/0058896 A1* | 3/2005 | Nomura et al. ............. | 429/142 |
| 2005/0271574 A1* | 12/2005 | Jang et al. .................. | 423/448 |
| 2006/0237697 A1 | 10/2006 | Kosuzu et al. | |
| 2006/0263689 A1 | 11/2006 | Ishihara et al. | |
| 2007/0020519 A1 | 1/2007 | Kim et al. | |
| 2007/0031730 A1 | 2/2007 | Kawakami et al. | |
| 2007/0122701 A1 | 5/2007 | Yamaguchi | |
| 2007/0148544 A1 | 6/2007 | Le | |
| 2008/0261116 A1* | 10/2008 | Burton et al. ............. | 429/231.8 |
| 2009/0068553 A1* | 3/2009 | Firsich ........................ | 429/122 |

OTHER PUBLICATIONS

Jang et al. "Processing of nanographene platelets (NGPs) and NGP nanocomposites: a review", J Mater Sci (2008) 43:5092-5101.*
Stankovich et al., "Graphene-based composite materials", Nature, vol. 442, pp. 282-286 (2006).*
U.S. Appl. No. 11/509,424, filed Aug. 25, 2006, B. Z. Jang, et al.
U.S. Appl. No. 11/526,489, filed Sep. 26, 2006, B. Z. Jang, et al.
U.S. Appl. No. 11/709,274, filed Feb. 22, 2007, B. Z. Jang, et al.
U.S. Appl. No. 11/787,442, filed Apr. 17, 2007, A. Zhamu, et al.
U.S. Appl. No. 11/800,728, filed May 8, 2007, A. Zhamu, et al.
U.S. Appl. No. 11/435,350, filed May 16, 2006, L. T. Drzal, et al.
U.S. Appl. No. 11/363,336, filed Feb. 27, 2006, L. T. Drzal, et al.
U.S. Appl. No. 11/361,255, filed Feb. 24, 2006, L. T. Drzal, et al.
U.S. Appl. No. 10/659,577, filed Sep. 10, 2003, L. T. Drzal, et al.
T. Zheng, Q. Zhong, and J. R. Dahn, J. Electrochem. Soc. 142 (1995) L211.
J. S. Xue and J. R. Dahn, J. Electrochem. Soc. 142 (1995) 3668.

(Continued)

*Primary Examiner*—Patrick Ryan
*Assistant Examiner*—Ladan Mohaddes

(57) ABSTRACT

The present invention provides a nano-scaled graphene platelet-based composite material composition for use as an electrode, particularly as an anode of a lithium ion battery. The composition comprises: (a) micron- or nanometer-scaled particles or coating which are capable of absorbing and desorbing lithium ions; and (b) a plurality of nano-scaled graphene platelets (NGPs), wherein a platelet comprises a graphene sheet or a stack of graphene sheets having a platelet thickness less than 100 nm; wherein at least one of the particles or coating is physically attached or chemically bonded to at least one of the graphene platelets and the amount of platelets is in the range of 2% to 90% by weight and the amount of particles or coating in the range of 98% to 10% by weight. Also provided is a lithium secondary battery comprising such a negative electrode (anode). The battery exhibits an exceptional specific capacity, an excellent reversible capacity, and a long cycle life.

17 Claims, 6 Drawing Sheets

OTHER PUBLICATIONS

F. Disma, L. Aymard, and J.-M. Tarascon, J. Electrochem. Soc., 143 (1996) 3959.
E. Peled, C. Menachem, A. Melman, J. Electrochem. Soc. 143 (1996) L4.
U. Rothlisberger and M. L. Klein, J. Am. Chem. Soc., 117, 42 (1995).
R. Yazami and M. Deschamps, J. Power Sources, 54 (1995) 411.
Y. Ein-Eli, V.R. Koch, J. Electrochem. Soc. 144 (1997) 2968.
H. Li, X. Huang, L. Chen, G. Zhou, Z. Zhang, D. Yu, Y. Mo, and N. Pei, Solid State Ionics, 135 (2000) 181.
S. Bourderau, T. Brousse, and D. M. Schleich, J. Power Source, 81-82 (1999) 233.
H. J. Jung, M. Park, Y. Yoon, K. Kim, and S. Joo, J. Power Sources, 115 (2003) 346.
D. Larcher, C. Mudalige, A.E. George, V. Porter, M. Gharghouri, J.R. Dahn, Solid State Ionics, 122 (1999) 71.
Y. P. Wu, C. Jiang, C. Wan and E. Tsuchida, "A Green Method for the Preparation of Anode Materials for Lithium Ion Batteries," J. Materials Chem., 11 (2001) 1233-1236.
S. Ohara, J. Suzuki, K. Sekine, and T. Takamura, J. Power Sources, 119-126 (2003) 591.
S. Hwang, H. Lee, S. Jang, S. Lee, H. Baik, and J. Lee, Electrochem. Solid State Letter, 4 (2001) A 97.
N. Dimove, K. Fukuda, T. Umeno, S. Kugino, and M. Yoshio, J. Power Sources, 114 (2003) 88.
Z. S. Wen, J. Yang, B. F. Wang, K. Wang, and Y. Liu, Electrochem. Communications, 5 (2003) 165.
N. Dimove, S. Kugino, and M. Yoshio, Electrochim. Acta, 48 (2003) 1579.
A.M. Wilson, G. Zank, K. Eguchi, W. Xing, J.R. Dahn, J. Power Sources, 68 (1997) 195.
Weibing Xing, A.M. Wilson, K. Eguchi, G. Zank, J.R. Dahn, J. Electrochem. Soc. 144 (1997) 2410.
A.M. Wilson, J.R. Dahn, J. Electrochem. Soc. 142 (1995) 326.
Noriyuki Kurita and Morinobu Endo, Carbon, 40 (2002) 253.
M. J. McAllister, et al. "Single Sheet Functionalized Graphene by Oxidation and Thermal Expansion of Graphite," Chem. Materials, 19 (Mar. 14, 2007).
H. C. Schniepp, et al., "Functionalized Single Graphene Sheets Derived from Splitting Graphite Oxide," J. Phys. Chem., B 110 (2006) 8535.
G. H. Chen, et al. "Preparation and Characterization of Graphite Nano-sheets from Ultrasonic Powdering Technique," Carbon, 42 (2004) 753-759.

* cited by examiner

FIG. 2 — 100 nm

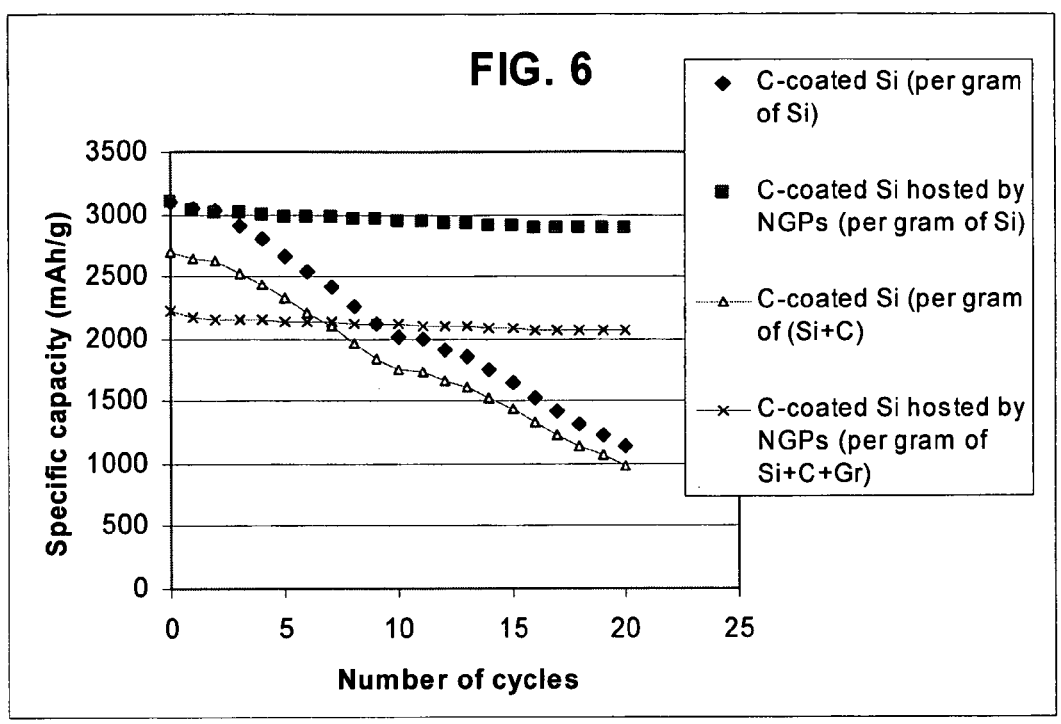

NANO GRAPHENE PLATELET-BASE COMPOSITE ANODE COMPOSITIONS FOR LITHIUM ION BATTERIES

This invention is based on the research result of a U.S. Federal Government Small Business Innovation Research (SBIR) project. The U.S. government has certain rights on this invention.

This is a co-pending application of Aruna Zhamu and Bor Z. Jang, "HYBRID ANODE COMPOSITIONS FOR LITHIUM ION BATTERIES," submitted to the U.S. Patent and Trademark Office on the same day as the instant application.

FIELD OF THE INVENTION

The present invention provides a nano-scaled graphene platelet-based composite material for use as an anode active material in a secondary battery, particularly lithium-ion battery.

BACKGROUND

The description of prior art will be primarily based on the list of references presented at the end of this section.

Concerns over the safety of earlier lithium secondary batteries led to the development of lithium ion secondary batteries, in which pure lithium metal sheet or film was replaced by carbonaceous materials as the anode. The carbonaceous material may comprise primarily graphite that can be intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized. Carbon anodes can have a long cycle life due to the presence of a protective surface-electrolyte interface layer (SEI), which results from the reaction between lithium and the electrolyte during the first several cycles of charge-discharge. The lithium in this reaction comes from some of the lithium ions originally intended for the charge transfer purpose. As the SEI is formed, the lithium ions become part of the inert SEI layer and become irreversible, i.e, they can no longer be the active element for charge transfer. Therefore, it is desirable to use a minimum amount of lithium for the formation of an effective SEI layer. In addition to SEI formation, $Q_{ir}$ has been attributed to graphite exfoliation caused by electrolyte solvent co-intercalation and other side reactions [Refs. 1-4].

The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g. In other graphitized carbon materials than pure graphite crystals, there exists a certain amount of graphite crystallites dispersed in or bonded by an amorphous or disordered carbon matrix phase. The amorphous phase typically can store lithium to a specific capacity level higher than 372 mAh/g, up to 700 mAh/g in some cases, although a specific capacity higher than 1,000 mAh/g has been sporadically reported. Hence, the magnitude of x in a carbonaceous material $Li_xC_6$ varies with the proportion of graphite crystallites and can be manipulated by using different processing conditions, as exemplified in [Refs. 1-4]. An amorphous carbon phase alone tends to exhibit a low electrical conductivity (high charge transfer resistance) and, hence, a high polarization or internal power loss. Conventional amorphous carbon-based anode materials also tend to give rise to a high irreversible capacity.

The so-called "amorphous carbons" commonly used as anode active materials are typically not purely amorphous, but contain some micro- or nano-crystallites with each crystallite being composed of a small number of graphene sheets (basal planes) that are stacked and bonded together by weak van der Waals forces. The number of graphene sheets varies between one and several hundreds, giving rise to a c-directional dimension (thickness Lc) of typically 0.34 nm to 100 nm. The length or width (La) of these crystallites is typically between tens of nanometers to microns. Among this class of carbon materials, soft and hard carbons made by low-temperature pyrolysis (550-1,000° C.) exhibit a reversible capacity of 400-800 mAh/g in the 0-2.5 V range [Refs. 1-3]. Dahn et al. have made the so-called house-of-cards carbonaceous material with enhanced capacities approaching 700 mAh/g [Refs. 1,2]. Tarascon's research group obtained enhanced capacities of up to 700 mAh/g by milling graphite, coke, or carbon fibers [Ref. 3]. Dahn et al. explained the origin of the extra capacity with the assumption that in disordered carbon containing some dispersed graphene sheets (referred to as house-of-cards materials), lithium ions are adsorbed on two sides of a single graphene sheet [Refs. 1,2]. It was also proposed that Li readily bonded to a proton-passivated carbon, resulting in a series of edge-oriented Li—C—H bonds. This provides an additional source of $Li^+$ in some disordered carbons [Ref. 5]. Other researchers suggested the formation of Li metal mono-layers on the outer graphene sheets [Ref. 6] of graphite nano-crystallites. The amorphous carbons of Dahn et al. were prepared by pyrolyzing epoxy resins and may be more correctly referred to as polymeric carbons. Polymeric carbon-based anode materials were also studied by Zhang, et al. [Ref. 8] and Liu, et al. [Ref. 9].

Peled and co-workers improved the reversible capacity of a graphite electrode to ~400 mAh/g by mild air oxidation [Ref. 4]. They showed that mild oxidation (burning) of graphite produces well-defined voids or nano-channels, having an opening of a few nanometers and up to tens of nanometers, on the surface of the graphite. They believed that these nano-channels were small enough to prevent co-intercalation of the solvent molecule but large enough to allow Li-ion penetration [Ref. 4]. These nano-channels were formed at the La-Lc interface, called "zigzag and armchair faces" between two adjacent crystallites, and in the vicinity of defects and impurities. Both natural and synthetic graphite materials typically have a wide variety of functional groups (e.g., carbonate, hydrogen, carboxyl, lactone, phenol, carbonyl, ether, pyrone, and chromene) at the edges of crystallites defined by La and Lc [Ref. 7]. These groups can react with lithium and/or electrolyte species to form a so-called in situ CB-SEI (chemically bonded solid electrolyte interface) [Ref. 4] on which, for example, carboxylic acid surface films are converted into Li-carboxylic salts.

In summary, in addition to the above-cited three mechanisms, the following mechanisms for the extra capacity over the theoretical value of 372 mAh/g have been proposed [Ref. 4]: (i) lithium can occupy nearest neighbor sites; (ii) insertion of lithium species into nano-scaled cavities; (iii) in very disordered carbons containing large fractions of single graphene sheets (like the structure of a house of cards) lithium may be adsorbed on both sides of single layer sheets [Refs. 1,2]; (iv) correlation of H/C ratio with excess capacity led to a proposal that lithium may be bound somehow in the vicinity of the hydrogen atoms (possible formation of multi-layers of lithium on the external graphene planes of each crystallite in disordered carbons) [Ref. 6]; and (vi) accommodation of lithium in the zigzag and armchair sites [Ref. 4].

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions. In particular, lithium alloys having a composition formula of $Li_aA$ (A is a metal such as Al, and "a" satisfies $0<a\leqq5$) has been investigated as potential anode materials. This class of anode material has a higher theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, for the anodes composed of these materials, pulverization (fragmentation of the alloy particles) proceeds with the progress of the charging and discharging cycles due to expansion and contraction of the anode during the absorption and desorption of the lithium ions. The expansion and contraction also tend to result in reduction in or loss of particle-to-particle contacts or contacts between the anode and its current collector. These adverse effects result in a significantly shortened charge-discharge cycle life.

To overcome the problems associated with such mechanical degradation, composites composed of small electrochemically active particles supported with less active or non-active matrices have been proposed for use as an anode material. Examples of these active particles are Si, Sn, and $SnO_2$. However, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction steps, and/or undesirable side effects.

For instance, as disclosed in U.S. Pat. No. 6,007,945 (Dec. 28, 1999) by Jacobs, et al., a solid solution of titanium dioxide and tin dioxide was utilized as the anode active substance in the negative electrode of a rechargeable lithium battery. The density of the negative electrode made as described above was 3.65 g/cm$^3$, and the reversible capacity of the negative electrode containing $TiO_2$—$SnO_2$ in a ratio of 39:61 by weight, was found to be 1130 mAh/cm$^3$. This was equivalent to 309.6 mAh/g, although the obtained rechargeable lithium battery was calculated to have energy density of 207 wat-t.hour per liter. Furthermore, the nanoparticles of the anode material react with the electrolyte during the charge-discharge cycles, resulting in reduced long-term utility.

As described in U.S. Pat. No. 6,143,448 (Nov. 7, 2000), by Fauteux et al., a composite was formed by mixing carbon with a metal salt in water, followed by evaporation, heating and further treatment. The process produces a composite with many pores, which are not always preferred. The best achievable capacity was reported to be in the range of 750-2,000 mAh/cm$^3$. With a density of 4 g/cm$^3$, this implies a maximum capacity of 500 mAh/g In U.S. Pat. No. 6,103,393 (Aug. 15, 2000), Kodas et al. provided carbon-metal particles by mixing the reactant, making the mixture into an aerosol, and then heating. Every particle contains a carbon phase and a metal phase. This study was primarily on carbon-supported platinum, silver, palladium, ruthenium, osmium and alloys thereof, which are for electro-catalysis purpose (e.g., for fuel cell applications).

In U.S. Pat. No. 7,094,499 (Aug. 22, 2006), Hung disclosed a method of forming a composite anode material. The steps include selecting a carbon material as a constituent part of the composite, chemically treating the selected carbon material to receive nanoparticles, incorporating nanoparticles into the chemically treated carbon material, and removing surface nanoparticles from an outside surface of the carbon material with incorporated nanoparticles. A material making up the nanoparticles alloys with lithium. The resulting carbon/nanoparticle composite anodes did not exhibit any significant increase in capacity, mostly lower than 400 mAh/g.

In summary, the prior art has not demonstrated a composite material that has all or most of the properties desired for use in an anode for the lithium-ion battery. Thus, there is a need for a new anode for lithium-ion batteries that has a high cycle life, high reversible capacity, and low irreversible capacity. There is also a need for a method of readily or easily producing such a material.

REFERENCES

1. T. Zheng, Q. Zhong, and J. R. Dahn, J. Electrochem. Soc. 142 (1995) L211.
2. J. S. Xue and J. R. Dahn, J. Electrochem. Soc. 142 (1995) 3668.
3. F. Disma, L. Aymard, and J.-M. Tarascon, J. Electrochem. Soc., 143 (1996) 3959.
4. E. Peled, C. Menachem, A. Melman, J. Electrochem. Soc. 143 (1996) L4.
5. U. Rothlisberger and M. L. Klein, J. Am. Chem. Soc., 117, 42 (1995).
6. R. Yazami and M. Deschamps, J. Power Sources, 54 (1995) 411.
7. Y. Ein-Eli, V. R. Koch, J. Electrochem. Soc. 144 (1997) 2968.
8. Zhang, et al., "Carbon Electrode Materials for Lithium Battery Cells and Method of Making Same," U.S. Pat. No. 5,635,151 (Jun. 3, 1997).
9. Liu, et al., "Composite Carbon Materials for Lithium Ion Batteries, and Method of Producing Same," U.S. Pat. No. 5,908,715 (Jun. 1, 1999).
10. Tanaka, et al., "Carbon Anode for Secondary Battery," U.S. Pat. No. 5,344,726 (Sep. 6, 1994).
11. Nishimura, et al., "Nonaqueous Secondary Battery and a Method of Manufacturing a Negative Electrode Active Material," U.S. Pat. No. 5,965,296 (Oct. 12, 1999).
12. Yamada, et al., "Nonaqueous Secondary Battery," U.S. Pat. No. 6,040,092 (Mar. 21, 2000).
13. R. A. Greinke, et al., "Anode for Lithium Ion Battery," U.S. Pat. No. 6,555,271 (Apr. 29, 2003).
14. H. Li, X. Huang, L. Chen, G. Zhou, Z. Zhang, D. Yu, Y. Mo, and N. Pei, Solid State Ionics, 135 (2000) 181.
15. S. Bourderau, T. Brousse, and D. M. Schleich, J. Power Source, 81-82 (1999) 233.
16. J. Jung, M. Park, Y. Yoon, K. Kim, and S. Joo, J. Power Sources, 115 (2003) 346.
17. S. Ohara, J. Suzuki, K. Sekine, and T. Takamura, J. Power Sources, 119-126 (2003) 591.
18. S. Hwang, H. Lee, S. Jang, S. Lee, H. Baik, and J. Lee, Electrochem. Solid State Letter, 4 (2001) A 97.
19. N. Dimove, K. Fukuda, T. Umeno, S. Kugino, and M. Yoshio, J. Power Sources, 114 (2003) 88.
20. Z. S. Wen, J. Yang, B. F. Wang, K. Wang, and Y. Liu, Electrochem. Communications, 5 (2003) 165.
21. N. Dimove, S. Kugino, and M. Yoshio, Electrochim. Acta, 48 (2003) 1579.
22. A. M. Wilson, G. Zank, K. Eguchi, W. Xing, J. R. Dahn, J. Power Sources, 68 (1997) 195.
23. Weibing Xing, A. M. Wilson, K. Eguchi, G. Zank, J. R. Dahn, J. Electrochem. Soc. 144 (1997) 2410.

24. A. M. Wilson, J. R. Dahn, J. Electrochem. Soc. 142 (1995) 326.
25. D. Larcher, C. Mudalige, A. E. George, V. Porter, M. Gharghouri, J. R. Dahn, Solid State Ionics, 122 (1999) 71.
26. Noriyuki Kurita and Morinobu Endo, Carbon, 40 (2002) 253.
27. C. C. Hung, "Carbon Materials Metal/Metal Oxide Nanoparticle Composite and Battery Anode Composed of the Same, U.S. Pat. No. 7,094,499 (Aug. 22, 2006).
28. D. Clerc, et al., "Multiphase Material and Electrodes Made Therefrom," U.S. Pat. No. 6,524,744 (Feb. 25, 2003).
29. D. L. Foster, et al., "Electrode for Rechargeable Lithium-Ion Battery and Method for Fabrication," U.S. Pat. No. 6,316,143 (Nov. 13, 2001).
30. D. B. Le, "Silicon-Containing Alloys Useful as Electrodes for Lithium-Ion Batteries," US 2007/0148544 (Pub. Jun. 28, 2007).
31. H. Yamaguchi, "Anode Material, Anode and Battery," US 2007/0122701 (Pub. May 31, 2007).
32. S. Kawakami, et al., "Electrode Material for Anode of Rechargeable Lithium Battery," US 2007/0031730 (Pub. Feb. 8, 2007).
33. H. Kim, et al., "Anode Active Material, Manufacturing Method Thereof, and Lithium Battery Using the Anode Active Material," US 2007/0020519 (Pub. Jan. 25, 2007).
34. H. Ishihara, "Anode Active Material and Battery," US 2006/0263689 (Pub. Nov. 23, 2006).
35. T. Kosuzu, et al., "Electrode Material for Rechargeable Lithium Battery," US 2006/0237697 (Pub. Oct. 26, 2006).
36. J. J. Mack, et al., "Chemical Manufacture of Nanostructured Materials," U.S. Pat. No. 6,872,330 (Mar. 29, 2005).
37. Bor Z. Jang, Aruna Zhamu, and Jiusheng Guo, "Process for Producing Nano-scaled Platelets and Nanocomposites," U.S. patent application Ser. No. 11/509,424 (Aug. 25, 2006).
38. Bor Z. Jang, Aruna Zhamu, and Jiusheng Guo, "Mass Production of Nano-scaled Platelets and Products," U.S. patent application Ser. No. 11/526,489 (Sep. 26, 2006).
39. Bor Z. Jang, Aruna Zhamu, and Jiusheng Guo, "Method of Producing Nano-scaled Graphene and Inorganic Platelets and Their Nanocomposites," U.S. patent application Ser. No. 11/709,274 (Feb. 22, 2007).
40. Aruna Zhamu, JinJun Shi, Jiusheng Guo, and Bor Z. Jang, "Low-Temperature Method of Producing Nano-scaled Graphene Platelets and Their Nanocomposites," U.S. patent application Ser. No. 11/787,442 (Apr. 17, 2007).
41. Aruna Zhamu, Jinjun Shi, Jiusheng Guo and Bor Z. Jang, "Method of Producing Exfoliated Graphite, Flexible Graphite, and Nano-Scaled Graphene Plates," U.S. patent application Ser. No. 11/800,728 (May 8, 2007).
42. E. Gulari, et al., "Method of Delaminating a Graphite Structure with a Coating Agent in a Spercritical Fluid," U.S. Pat. No. 7,157,517 (Jan. 2, 2007).
43. D. M. Kaschak, et al., "Graphite Intercalation and Exfoliation Process," U.S. Pat. No. 7,105,108 (Sep. 12, 2006).
44. M. J. McAllister, J. L. Li, D. H. Adamson, H. C. Schniepp, A. A. Abdala, Jun Liu, M. Herrera-Alonso, D. L. Milius, R. Car, R. K. Prud'homme, and I. A. Aksay, "Single Sheet Functionalized Graphene by Oxidation and Thermal Expansion of Graphite," Chem. Materials, 19 (Mar. 14, 2007).
45. H. C. Schniepp, J. L. Li, M. J. McAllister, H. Sai, M. Herrera-Alonso, D. H. Adamson, R. K. Prud'homme, R. Car, D. A. Saville and I. A. Aksay, "Functionalized Single Graphene Sheets Derived from Splitting Graphite Oxide," J. Phys. Chem., B 110 (2006) 8535.
46. M. Hirata and S. Horiuchi, "Thin-Film-Like Particles Having Skeleton Constructed by Carbons and Isolated Films," U.S. Pat. No. 6,596,396 (Jul. 22, 2003).
47. L. T. Drzal, H. Fukushima, B. Rook, and M. Rich, "Continuous Process for Producing Exfoliated Nano-Graphite Platelets," U.S. patent application Ser. No. 11/435,350 (May 16, 2006).
48. L. T. Drzal and H. Fukushima, "Expanded Graphite and Products Produced Therefrom," U.S. patent application Ser. No. 11/363,336 (Feb. 27, 2006); 11/361,255 (Feb. 24, 2006); 10/659,577 (Sep. 10, 2003).
49. G. H. Chen, W. Weng, D. Wu, C. Wu, J. Lu, P. Wang, X. Chen, "Preparation and Characterization of Graphite Nano-sheets from Ultrasonic Powdering Technique," *Carbon*, 42 (2004) 753-759.

SUMMARY OF THE INVENTION

The present invention provides a negative electrode (anode) composite material composition for use in a lithium secondary battery. The composition comprises an electrochemically active material admixed with nano-scaled graphene platelets (NGPs), characterized in that both the active material and the NGPs are capable of absorbing and desorbing lithium ions. The electrochemically active material is in a fine powder form (smaller than 500 μm, preferably smaller than 200 μm, and most preferably smaller than 1 μm) and/or thin film (coating) form (preferably smaller than 100 nm in thickness), in contact with or attached to graphene platelets.

An NGP is essentially composed of a sheet of graphene plane or multiple sheets of graphene plane stacked and bonded together through van der Waals forces. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 1 μm and 20 μm, but could be longer or shorter. The NGPs form a myriad of electron transport paths for improving the electrical conductivity or reducing the internal resistance of the anode. The flexibility and strength of NGPs make them ideal materials to absorb or buffer the volume expansion or contraction of the electrochemically active material particles or coating. NGPs themselves are also capable of absorbing and extracting lithium (explained in a later section).

The electrochemically active material in the present invention can be selected from the following groups of materials:

(a) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) or micron- or nanometer-sized particulate form. The coating is preferably thinner than 10 μm and more preferably thinner than 1 μm;

(b) The alloys or intermetallic compounds of Si, Ge, Sn, Pb, Sb, Bi, Zn, Al, or Cd, stoichiometric or non-stoichiometric with other elements;

(c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd. For instance, SnO or $SnO_2$ may be admixed with oxides of B, Al, P, Si, Ge, Ti, Mn, Fe, or Zn and then subjected to heat treatments to obtain composite oxides. Composite oxides may also be prepared by mechanical alloying (e.g., ball milling of a mixture of SnO and $B_2O_3$). SnO or $SnO_2$ alone is of particular interest due to their high theoretical capacities. Iron oxide or phosphate is of interest since $Li_6Fe_2O_3$ has a theoretical capacity of 1,000 mAh/g. The first cycle capacity of $Fe_3PO_7$ is found to reach 800 mAh/g. The capacity of $SnS_2$ is as high as 620 mAh/g and is stable under charge-discharge cycling conditions.

(d) Salts or hydroxides of Sn, e.g., $SnSO_4$ (with a reversible of 600 mAh/g), $Sn_2PO_4Cl$, (300 mAh/g even after 40 cycles), and $Sn_3O_2(OH)_2$ (300 mAh/g).

Optionally, amorphous carbon or polymeric carbon can be incorporated, in addition to any material in (a)-(d), in the exfoliated graphite host. The composite material (or its constituent active material and NGPs independently) may be mixed with a resin to form a precursor composite. This precursor composite may be heated at a temperature of typically 500-1,200° C. to convert the resin into a polymeric carbon or an amorphous carbon phase. Hence, in the presently invented negative electrode material composition, the composite material may further comprise an amorphous carbon phase or polymeric carbon. Alternatively, the amorphous carbon phase may be obtained from chemical vapor deposition, chemical vapor infiltration, or pyrolyzation of an organic precursor.

The electrochemically active materials listed in (a)-(d) above, when used alone as an anode material (with or without a polymer binder) in a particulate or thin film form, are found to suffer from the fragmentation problem and poor cycling stability. When mixed with the NGPs to form a composite material, the resulting anode exhibits a reversible capacity much higher than that of graphite (372 mAh/g), a low irreversible capacity loss, low internal resistance, and fast charge-recharge processes. It seems that NGPs, being mechanically flexible, are capable of accommodating or cushioning the strains or stresses induced by lithium insertion and extraction. With the active material particle size or coating thickness less than 1 µm, the distance for lithium ions to travel is reduced. The anode can quickly store or release lithium and thus can carry high current. This is a highly beneficial feature for a battery that is intended for high power density applications such as electric cars. NGPs also serve to separate or isolate active material particles from one another, preventing coalescence or sintering of fine particles. Furthermore, when the amount reaches a threshold volume fraction (percolation condition), NGPs form a continuous path for electrons, resulting in significantly reduced internal energy loss or internal heating.

The nano-scaled graphene platelets may be obtained from intercalation, exfoliation, and separation of graphene sheets in a laminar graphite material selected from natural graphite, synthetic graphite, highly oriented pyrolytic graphite, graphite fiber, carbon fiber, carbon nano-fiber, graphitic nano-fiber, spherical graphite or graphite globule, meso-phase microbead, meso-phase pitch, graphitic coke, or polymeric carbon. For instance, natural graphite may be subjected to an intercalation/oxidation treatment under a condition comparable to what has been commonly employed to prepare the so-called expandable graphite or stable graphite intercalation compound (GIC). This can be accomplished, for instance, by immersing graphite powder in a solution of sulfuric acid, nitric acid, and potassium permanganate for preferably 2-24 hours (details to be described later). The subsequently dried product, a GIC, is then subjected to a thermal shock (e.g., 1,000° C. for 15-30 seconds) to obtain exfoliated graphite worms, which are networks of interconnected exfoliated graphite flakes with each flake comprising one or a multiplicity of graphene sheets. The exfoliated graphite is then subjected to mechanical shearing (e.g., using an air milling, ball milling, or ultrasonication treatment) to break up the exfoliated graphite flakes and separate the graphene sheets {Refs. 36-49]. These NGPs can be mixed with electrochemically active material particles, or the platelet surfaces may be deposited with a coating of the active material.

It may be noted that exfoliated graphite worms and NGPs are quite distinct in structure, morphology, and properties. For instance, exfoliated graphite worms are characterized by having networks of largely interconnected graphite flakes having pores or empty pockets between flakes. The densities of worms are between 0.01 g/cm³ and 2.0 g/cm³. These flakes have a typical length/width/diameter dimension of 0.5-100 µm (more typically 1-20 µm) and typical thickness of 0.34 nm-500 nm (more typically 10-100 nm). These flakes are still physically attached to or chemically bonded to one another. Upon separation and some further exfoliation of graphene sheets that constitute the flakes, the networks are broken, the flakes are separated, and some flakes are further split into thinner platelets. Hence, the NGPs typically are much thinner than their parent flakes and often smaller in length/width/diameter. Individual NGPs have a density of approximately 2.3 g/cm³. We have found that, although NGPs have been physically separated from one another, they can be dispersed (mixed with another material) in such a manner that only a small weight fraction of NGPs would be sufficient to reach a percolation state that establishes a network of electron-conducting paths. Separated NGPs also enable more convenient and often more uniform mixing between platelets and other ingredients, such as the electrochemically active particles or coating cited in the present invention. For these and other reasons, NGPs and graphite worms are patently distinct and, hence, the instant application is patently distinct from the co-pending application: Aruna Zhamu and Bor Z. Jang, "HYBRID ANODE COMPOSITIONS FOR LITHIUM ION BATTERIES," submitted to the U.S. Patent and Trademark Office on the same day.

In the preparation of a negative electrode material, typically electrochemically active particles are held together by the NGPs if the particle-NGP mixture is slightly compressed. Although not a necessary condition, a binder material may be used to further bond the particles together to produce an integral anode member. The binder material may be a non-conductive material, such as polyvinylidene fluoride (PVDF) and poly(tetrafluoroethylene) (PTFE). An electrically conductive binder material may be selected from coal tar pitch, petroleum pitch, meso-phase pitch, coke, a pyrolized version of pitch or coke, or a conjugate chain polymer (intrinsically conductive polymer such as polythiophene, polypyrrole, or polyaniline.

Another preferred embodiment of the present invention is a lithium secondary battery comprising a positive electrode, a negative electrode, and a non-aqueous electrolyte disposed between the negative electrode and the positive electrode. The anode (negative electrode) comprises a composite composition composed of an electrochemically active material admixed with NGPs, characterized in that both the active material and the NGPs are capable of absorbing and desorbing lithium ions. The active material can be in the form of fine particles or thin coating film. The anode material in the present invention provides a reversible specific capacity of typically greater than 600 mAh/g, often greater than 800 mAh/g, and, in many cases, much greater than 1,000 mAh/g (all based on per gram of composite material), which all far exceed the theoretical specific capacity of 372 mAh/g for graphite anode material. They also exhibit superior multiple-cycle behaviors with a small capacity fade and a long cycle life.

BRIEF DESCRIPTION OF THE DRAWINGS

FIG. 6 Four sets of specific capacity data: Series 1 (denoted by ♦) is for C-coated Si particles bonded by a resin binder with specific capacity calculated on the basis of per gram of Si (carbon weight not counted); Series 2 (denoted by ■) is for C-coated Si particles hosted by 20% by weight of NGPs with specific capacity calculated on the basis of per gram of Si (carbon and graphene weights not counted); Series 3 (denoted by x) is for C-coated Si particles bonded by a resin binder with specific capacity calculated on the basis of per gram of (Si+C); and Series 4 (denoted by Δ) is for C-coated Si particles hosted by 20% by weight of NGPs with specific capacity calculated on the basis of per gram of (Si+C+NGP).

DETAILED DESCRIPTION OF PREFERRED EMBODIMENTS

This invention is related to anode materials for high-capacity lithium secondary batteries, which are preferably secondary batteries based on a non-aqueous electrolyte or a polymer gel electrolyte. The shape of a lithium secondary battery can be cylindrical, square, button-like, etc. The present invention is not limited to any battery shape or configuration.

Figure 1:
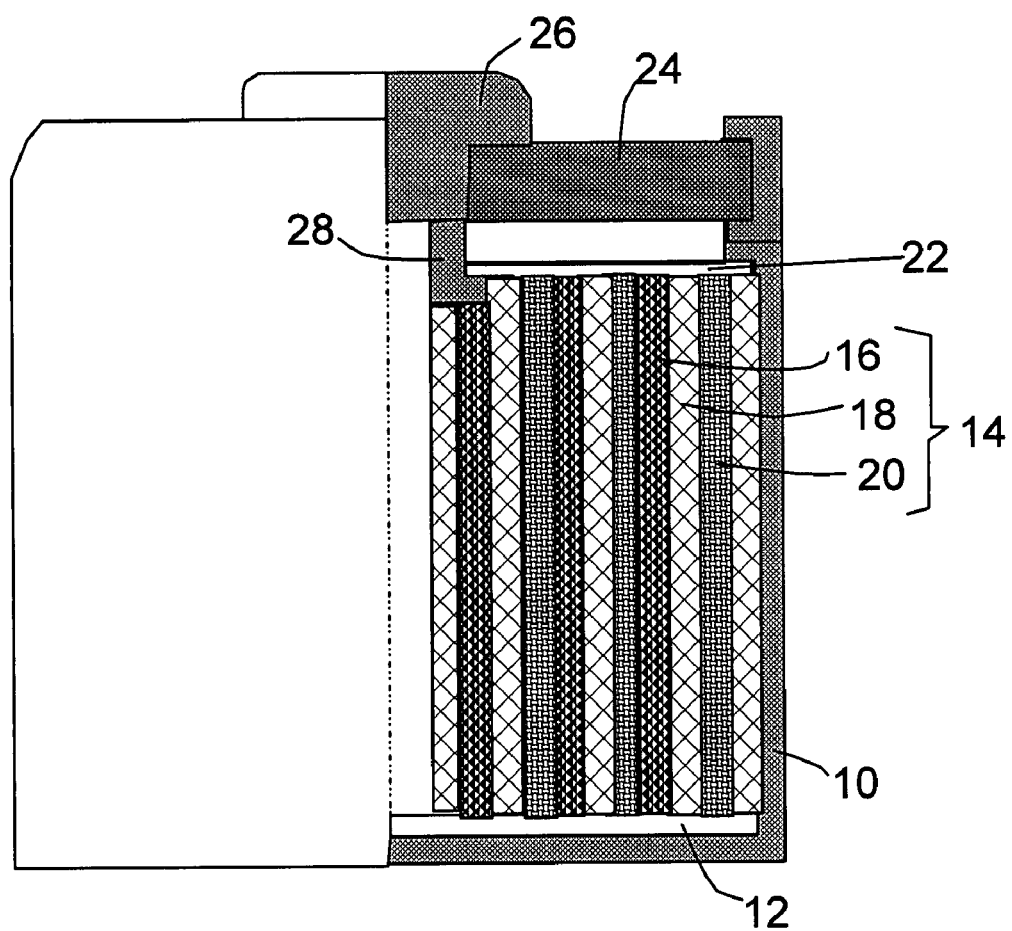
FIG. 1 Schematic of a cylinder-shape lithium ion battery.

As an example, a cylindrical battery configuration is shown in FIG. 1. A cylindrical case 10 made of stainless steel has, at the bottom thereof, an insulating body 12. An assembly 14 of electrodes is housed in the cylindrical case 10 such that a strip-like laminate body, comprising a positive electrode 16, a separator 18, and a negative electrode 20 stacked in this order, is spirally wound with a separator being disposed at the outermost side of the electrode assembly 14. The cylindrical case 10 is filled with an electrolyte. A sheet of insulating paper 22 having an opening at the center is disposed over the electrode assembly 14 placed in the cylindrical case 10. An insulating seal plate 24 is mounted at the upper opening of the cylindrical case 10 and hermetically fixed to the cylindrical case 10 by caulking the upper opening portion of the case 10 inwardly. A positive electrode terminal 26 is fitted in the central opening of the insulating seal plate 24. One end of a positive electrode lead 28 is connected to the positive electrode 16 and the other end thereof is connected to the positive electrode terminal 26. The negative electrode 20 is connected via a negative lead (not shown) to the cylindrical case 10 functioning as a negative terminal.

The positive electrode (cathode) active materials are well-known in the art. The positive electrode 16 can be manufactured by the steps of (a) mixing a positive electrode active material with a conductor agent (conductivity-promoting ingredient) and a binder, (b) dispersing the resultant mixture in a suitable solvent, (c) coating the resulting suspension on a collector, and (d) removing the solvent from the suspension to form a thin plate-like electrode. The positive electrode active material may be selected from a wide variety of oxides, such as manganese dioxide, lithium/manganese composite oxide, lithium-containing nickel oxide, lithium-containing cobalt oxide, lithium-containing nickel cobalt oxide, lithium-containing iron oxide and lithium-containing vanadium oxide. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium vanadium phosphate because these oxides provide a high cell voltage and good cycling stability.

Acetylene black, carbon black, ultra-fine graphite particles, or NGPs may be used as a conductor agent in the cathode. The binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 80 to 95% by weight for the positive electrode active material, 3 to 20% by weight for the conductor agent, and 2 to 7% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a synthetic resin nonwoven fabric, porous polyethylene film, porous polypropylene film, or porous PTFE film.

The negative electrode (anode), which the instant invention provides, is now explained in detail as follows: The anode composition comprises an electrochemically active material admixed with nano-scaled graphene platelets (NGPs) (e.g. FIG. 2). Both the electrochemically active material and the NGPs are capable of absorbing and desorbing lithium ions. For the purpose of defining dimensions of the active material, "micron-sized" in the present context is for those particles having a dimension <500 μm or for a coating having a thickness <500 μm. Hence, the electrochemically active material herein discussed is in a fine powder form (having a dimension in the range of 1 nm to 500 μm, more typically in the range of 10 nm to 200 μm) and/or thin film form (coating, typically in the range of 1 nm to 100 μm, but more typically in the range of 1 nm to 1 μm).

An NGP is essentially composed of a sheet of graphene plane or multiple sheets of graphene plane stacked and bonded together through van der Waals forces. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 1 μm and 20 μm, but could be longer or shorter. Typically NGPs have a specific surface area greater than about 100 $m^2$/gm when they have an average thickness thinner than 10 nm. The specific surface area can be greater than about 500 $m^2$/gm when they have an average thickness thinner than 2 nm. Single-sheet graphene has a theoretical specific surface area as high as 2,675 $m^2$/gm.

It is presumed that the top and bottom surfaces of a graphene platelet, single-sheet or multiple-sheet, are capable of adsorbing lithium. If single-sheet NGPs (single graphene sheets) are dispersed in an amorphous carbon, there can be a high lithium storage capacity associated with the resulting graphitic carbon morphology, something similar to what was observed by Zheng, et al [Ref. 1] and Xue, et al. [Ref. 2]. For a multiple-sheet NGP (e.g., comprising N graphene sheets bonded together), there are (N−1) interstices (spaces between two graphene sheets) that are capable of accepting or extracting lithium ions via intercalating and de-intercalating. Since individual or fully separated NGPs do not have defect areas, such as inter-crystallite boundaries in natural graphite or graphitic carbons, NGPs should have a reversible capacity very close to the theoretical limit (372 mAh/g) for perfectly lithiated graphite, $LiC_6$. With reduced platelet length and width and with all side surfaces (edges) of an NGP exposed to the electrolyte, the NGP enables fast, barrier-free diffusion of Li ions in and out of the interstices. This is conducive to fast charge and discharge of a secondary battery containing NGPs as an anode active material.

Figure 2:
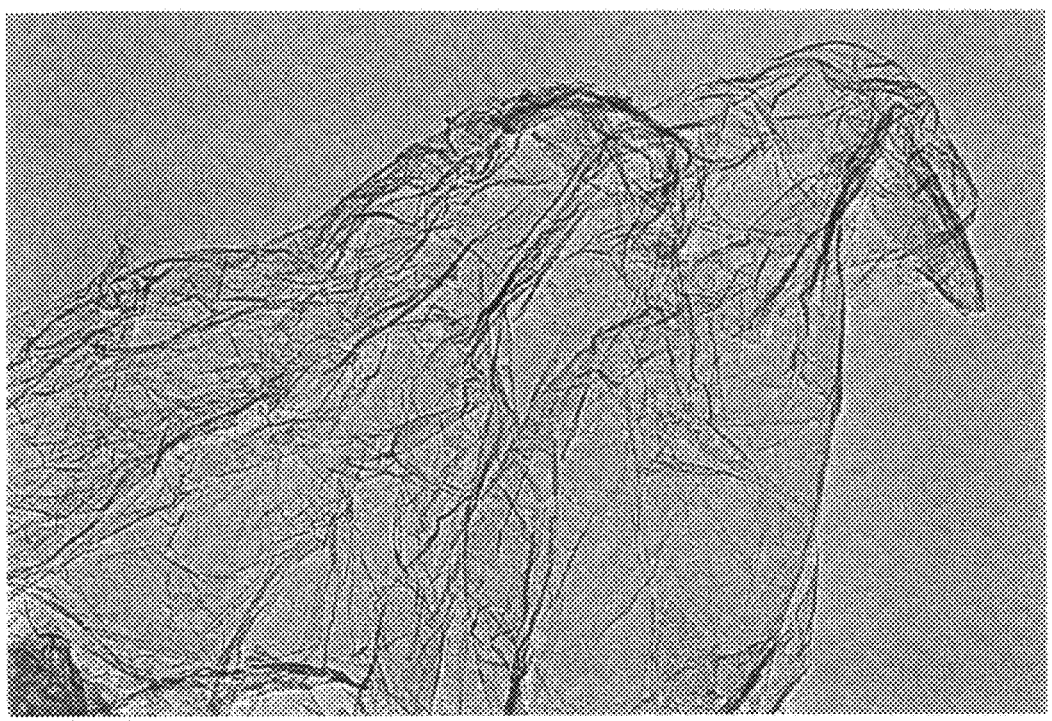
FIG. 2 TEM micrographs of NGPs (several NGPs overlapping each other).

It may be further noted that the NGPs can be as thin as <0.34 nm (single graphene sheet) or 0.68 nm (double-sheet) (e.g., FIG. 2). With a typical length/width of 1-10 μm, the aspect ratio (length/thickness) can be as high as 10 μm/0.34 nm=30,000. Such a unique form factor enables a small number of NGPs dispersed in a matrix material to easily reach a percolation condition to ensure the formation of a network of electron-conducting paths. Theoretically, it is possible to use only <1% by volume of NGPs to achieve percolation. However, to have a full capability of cushioning the volume change-induced stress or strains in a composite, more than 1% will be best. We recommend at least 5% by weight of NGPs in the composite anode.

The electrochemically active material (e.g., Si particles or film) is in contact with or attached to NGPs. The NGPs can form a network of electron transport paths for dramatically improved electrical conductivity or reduced internal resistance (hence, reduced energy loss and internal heat build-up). It appears that the mechanical flexibility of NGPs enables them to buffer or accommodate the expanded or contracted volume of the particles or coating during the charge-discharge cycling of the lithium ion battery, thereby avoiding the fragmentation of the particles or coating, or loss of contact with the anode current collector.

The electrochemically active material in the present invention is preferably selected from the following groups of materials:

(1) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) or micron- or nanometer-sized particulate form. The coating is preferably thinner than 10 μm and more preferably thinner than 1 μm; This group of material was chosen for our studies due to the notion that their theoretical capacity is significantly higher than that of graphite alone: $Li_{4.4}Si$ (3,829-4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g).

(2) The alloys or intermetallic compounds of Si, Ge, Sn, Pb, Sb, Bi, Zn, Al, or Cd, stoichiometric or non-stoichiometric, with other elements;

(3) The oxides, carbides, nitrides, sulfides, phosphides, selenides, tellurides, pnictides, or their mixtures (e.g., co-oxides or composite oxides) of Si, Ge, Sn, Pb, Sb, Bi, Zn, Al, Fe, or Cd.

(4) Salts or hydroxides of Sn, e.g., $SnSO_4$ (600 mAh/g), $Sn_2PO_4Cl$, (300 mAh/g even after 40 cycles), and $Sn_3O_2(OH)_2$ (300 mAh/g).

The NGPs can be obtained from the intercalation, exfoliation, and separation of graphene sheets of a laminar graphite material, explained as follows: Carbon materials can assume an essentially amorphous structure (glassy carbon), a highly organized crystal (graphite crystal or crystallite), or a whole range of intermediate structures that are characterized by having various proportions and sizes of graphite crystallites and defects dispersed in an amorphous carbon matrix. Typically, a graphite crystallite is composed of a number of graphene sheets or basal planes (also referred to as a-b planes) that are bonded together through van der Waals forces in the c-axis direction, the direction perpendicular to the basal plane. These graphite crystallites are typically micron- or nanometer-sized in the a- or b-direction (these are called La dimension). The c-directional dimension (or thickness) is commonly referred to as Lc. The interplanar spacing of a perfect graphite is known to be approximately 0.335 nm (3.35 Å). The graphite crystallites are dispersed in or connected by crystal defects or an amorphous phase in a laminar graphite particle, which can be a graphite flake (natural or synthetic, such as highly oriented pyrolytic graphite, HOPG), graphite spherule (spheroidal graphite or micro graphite ball), carbon/graphite fiber segment, carbon/graphite whisker, carbon/graphite nano-fiber (CNF or GNF), meso-phase micro-bead (MCMB). In the case of a carbon or graphite fiber segment, the graphene plates may be a part of a characteristic "turbostratic" structure.

According to a preferred embodiment of the present invention, a laminar graphite material can be subjected to a chemical treatment (intercalation and/or oxidation) to form a graphite intercalation compound (GIC). The GIC is then exposed a thermal shock (at a high temperature, typically 800-1,050° C.) for a short period of time (typically 15-60 seconds). The resulting products are networks of exfoliated graphite flakes commonly referred to as graphite worms. A graphite worm is characterized as having a network of largely interconnected exfoliated flaks with pores between flakes. The flakes have a typical length/width/diameter dimension of 0.5-100 μm (more typically 1-20 μm) and typical thickness of 0.34 nm-500 nm (more typically 10-100 nm). These flakes in a graphite worm remain substantially interconnected (physically in contact with each other or bonded to each other). Hence, a mechanical shearing treatment is typically needed to break up the flakes to form separated or isolated NGPs. It may be noted that individual NGPs are basically graphite crystals that have a high in-plane electrical conductivity, up to $10^4$-$10^5$ S/cm, which is orders of magnitude higher than that of carbon black, activated carbon, polymeric carbon, amorphous carbon, hard carbon, soft carbon, and meso-phase pitch, etc. This is particularly useful since an anode should have a low electrical resistance to reduce the energy loss. Individual NGPs have a density close to 2.3 $g/cm^3$.

In the present invention, upon mixing NGPs with an electrochemically active material, the resulting mixture may be subjected to re-compression to form an integral anode structure, in which the active material particles or coating are further held in place between NGPs (with or without a resin binder). Preferably, the NGP amount is in the range of 2% to 90% by weight and the amount of particles or coating is in the range of 98% to 10% by weight. It may be noted that Greinke, et al., in U.S. Pat. No. 6,555,271 (Apr. 29, 2003), disclosed a process for producing a lithium ion battery anode, the process comprising laminating particles of exfoliated graphite to a metallic substrate, such that the particles of exfoliated graphite form a binder-free sheet of graphite (flexible graphite sheet) having a thickness of no more than about 350 microns. However, no other non-carbon based electrochemically active material was included in the anode and, hence, the exfoliated graphite flakes tend to be highly oriented along the sheet plane direction (possibly making a significant amount of graphite flakes unaccessible to lithium ions). Hence, the best achievable reversible capacity remains much lower than 372 mAh/g of flexible graphite anode (the best reported valve being 0.51×372 mAh/g).

In one preferred embodiment, the NGPs are derived from natural graphite, synthetic graphite, highly oriented pyrolytic graphite, graphite fiber, carbon fiber, carbon nano-fiber, graphitic nano-fiber, spherical graphite or graphite globule, meso-phase micro-bead (MCMB), meso-phase pitch, graphitic coke, or polymeric carbon. For instance, natural flake graphite may be subjected to an electrochemical or chemical intercalation treatment under a condition comparable to what has been commonly employed to prepare the so-called expandable graphite or stable graphite intercalation compound. This can be accomplished by immersing graphite powder in a solution of sulfuric acid, nitric acid or nitrate, and potassium permanganate for preferably 1-24 hours (details to be described later). The resulting acid-intercalated graphite compound is then subjected to washing and rinsing and then dried to obtain expandable graphite. The expandable graphite is then heat-exfoliated and mechanically sheared to obtain NGPs.

The spheroidal graphite, produced by spheroidizing natural graphite flakes using a special thermo-chemical procedure, is available from several commercial sources (e.g., Huadong Graphite Co., Pingdu, China). The spheroidal graphite has a basically identical crystalline structure as in natural graphite, having relatively well-ordered crystallites with an interplanar spacing of 0.336 nm. The MCMB is obtained by extracting meso-phase particles out of other less-ordered carbon matrix and then graphitizing the meso-phase particles. They are typically supplied as a highly graphitic form of graphite. Commercial sources of MCMBs include Osaka Gas Company, Japan, China Steel Chemical Co., Taiwan, and Shanghai Shanshan Technology Co., China.

The starting laminar graphite material preferably has a numerical particle size (measured by a laser scattering method) that is smaller than about 25 μm, more preferably smaller than about 10 μm, and most preferably smaller than about 5 μm. The smaller particle size, leading to smaller NGPs, reduces lithium diffusion distances and increases the rate capability of the anode, which is a factor in preventing lithium plating at the anode.

For use as a starting laminar graphite material, meso-phase pitch, graphitic coke, or polymeric carbon may require additional graphitization treatment, typically at a temperature in the range of 1,500 to 3,000° C. to form nano- or micron-scaled graphite crystallites dispersed in an amorphous carbon matrix. Such a blend or composite of graphitic phase (graphite crystallites) and non-crystalline phase is then subjected to the same intercalation treatment to obtain an expandable graphite sample. The expandable graphite is then exposed to a thermal shock to obtain exfoliated graphite worms, which are the host material in the presently invented anode material.

The electrochemically active particles or coating of an anode material according to a preferred embodiment of the invention include at least one of silicon (Si), germanium (Ge), and tin (Sn) as an element. This is because silicon, germanium, and tin have a high capability of inserting and extracting lithium, and can reach a high energy density. The next preferred group of elements includes lead (Pb), antimony (Sb), bismuth (Bi), zinc (Zn), aluminum (Al), and cadmium (Cd). When any of these two sets of elements are included as a primary element of an electrochemically active material (defined as being capable of absorbing and extracting lithium ions in the present context), which is hosted by exfoliated graphite flakes, the cycling stability of the resulting anode material can be significantly improved.

Preferred examples of such an active material include the simple substance (metal element), an alloy, or a compound of silicon (Si), germanium (Ge), or tin (Sn), and combinations thereof. In general, the active material may include only one kind or a mixture of a plurality of kinds selected from the group consisting of Si, Ge, Sn, Pb, Sb, Bi, Zn, Al, and Cd. In the invention, the alloy or compound may include one or more kinds of metal elements from this group and one or more kinds of metal elements from other groups. Further, the alloy or compound may include a non-metal element. The active alloy or compound material may be a solid solution, a eutectic (eutectic mixture), an intermetallic compound (stoichiometric or non-stoichiometric), or the coexistence of two or more kinds selected from them. Preferably, the material comprises a nanocrystalline or amorphous phase.

As an alloy or compound of silicon, for example, an active material may include at least one element selected from the group consisting of tin (Sn), nickel (Ni), copper (Cu), iron (Fe), cobalt (Co), manganese (Mn), zinc (Zn), indium (In), silver (Ag), titanium, germanium (Ge), bismuth (Bi), antimony (Sb) and chromium (Cr) as a second element in addition to silicon. As an alloy or compound of tin, for example, an active material may include at least one kind selected from the group consisting of silicon, nickel, copper, iron, cobalt, manganese, zinc, indium, silver, titanium, germanium, bismuth, antimony and chromium as a second element in addition to tin.

As a compound of silicon or a compound of tin, for example, a compound including oxygen (O), carbon (C), nitrogen (N), sulfur (S), or phosphorous (P) may be used, and the compound may include the above-described second element in addition to tin or silicon. A preferred example is a SnCoC-containing material in which tin, cobalt and carbon are included as elements, and the carbon content is within a range from 9.9 wt % to 29.7 wt % inclusive, and the ratio Co/(Sn+Co) of cobalt to the total of tin and cobalt is within a range from 30 wt % to 70 wt % inclusive, because a high energy density and superior cycle characteristics can be obtained within such a composition range for an electrochemically active material hosted by exfoliated graphite flakes.

The SnCoC-containing material may further include any other element, if necessary. As the element, for example, silicon, iron, nickel, chromium, indium, niobium (Nb), germanium, titanium, molybdenum (Mo), aluminum, phosphorus (P), gallium (Ga) or bismuth is preferable, and two or more kinds selected from them may be included. This suggestion is based on the observation that the capacity and the cycle characteristics of anodes can be further improved. The SnCoC-containing material includes a phase including tin, cobalt and carbon, and the phase preferably has a nanocrystalline structure or an amorphous structure. Moreover, in the SnCoC-containing material, at least a part of carbon if added as an element, is preferably bonded to a metal element or a metal compound. This is based on the consideration that a decline in the cycle characteristics of prior art lithium ion battery is caused by cohesion or crystallization of tin or the like. When carbon is bonded to the metal or compound, such cohesion or crystallization can be inhibited. However, we have observed that, with the active material hosted in the pores between exfoliated graphite flakes, there has been minimal or not cohesion or crystallization. Presumably, this is one of the major advantages of using exfoliated graphite flakes as a host.

Such an electrochemically active material can be manufactured, for example, by simply mixing the materials of all elements to form a mixture, melting the mixture in an electric furnace, a high-frequency induction furnace, an arc furnace or the like, and then solidifying the mixture. The material may also be made by various atomization methods, such as gas atomization or water atomization, various roll methods, or methods using a mechanochemical reaction, such as a mechanical alloying method or a mechanical milling method. The active material is preferably manufactured by the method using a mechanochemical reaction, because the active material can have a low crystalline (or nano-crystalline) structure or an amorphous structure. In this method, for example, a manufacturing apparatus such as a high energy planetary ball mill or a mechanical attritor can be used. The resulting fine particles are then mechanically blended with graphite worms in a dry blender or a solution/liquid mixer. In the later case, the liquid phase involved has to be removed.

The active material in a thin film or coating form (on a surface of graphene platelets) may be formed through depositing the material by, for example, a liquid-phase deposition method, an electrodeposition method, a dip coating method, an evaporation method, a sputtering method, a CVD (Chemical Vapor Deposition) method, or the like. The coating is preferably formed by the liquid-phase deposition method among them, because the deposition of an extremely small amount of the active material (e.g., SnO or $SnO_2$) can be easily controlled.

As an example, the liquid-phase deposition method is a method of depositing the metal oxide coating on a surface of graphite flakes. For instance, this can be accomplished by adding a dissolved species, which easily coordinates fluorine (F) as an anion trapping agent, into a metal fluoride complex solution, and immersing the exfoliated graphite flakes in the solution, and then trapping a fluorine anion generated from the metal fluoride complex by the dissolved species. Alternatively, for example, a metal compound generating another anion such as a sulfate ion may be used. The sol-gel technique may be used to impregnate graphite worms and then subjected to final conversion to the fine particles, such as silicon dioxide, $SiO_2$.

Another preferred class of electrochemically active material that can be hosted by NGPs includes the oxides, carbides, nitrides, sulfides, phosphides, selenides, tellurides, or their mixtures (e.g., co-oxides or composite oxides) of Si, Ge, Sn, Pb, Sb, Bi, Zn, Al, Fe, or Cd. They can be readily produced in a fine powder or thin film form. For instance, SnO or $SnO_2$ may be admixed with oxides of B, Al, P, Si, Ge, Ti, Mn, Fe, or Zn and then subjected to heat treatments to obtain composite oxides. Composite oxides may also be prepared by mechanical alloying (e.g., ball milling of a mixture of SnO and $B_2O_3$). SnO or $SnO_2$ alone is of particular interest due to their high theoretical capacities. Iron oxides or phosphates are of interest since $Li_6Fe_2O_3$ has a theoretical capacity of 1,000 mAh/g. The first cycle capacity of $Fe_3PO_7$ is found to reach 800 mAh/g. The capacity of $SnS_2$ is as high as 620 mAh/g and is stable under charge-discharge cycling conditions.

Combined atomization (or vaporization) and reaction can be used to obtain the oxides, carbides, nitrides, sulfides, phosphides, selenides, tellurides, or their mixtures, as illustrated in W. C. Huang, "Method for the Production of Semiconductor Quantum Particles," U.S. Pat. No. 6,623,559 (Sep. 23, 2003) and J. H. Liu and B. Z. Jang, "Process and Apparatus for the Production of Nano-Scaled Powders," U.S. Pat. No. 6,398,125 (Jun. 4, 2002).

It may be noted that $Li_3N$ has a high lithium ion conductivity. When allowed to react with a transition metal M, such as Co, Ni, or Cu, the $Li_3N$ can be readily transformed into $Li_{3-x}M_xN$. During the lithium ion extraction process, the nitride is transformed from a crystalline state to an amorphous state, resulting in a significant volume change. Due to the presence of NGPs, such a volume change did not lead to a volume change-induced failure of the anode and the anode appeared to provide a much better cycling response. As an example, we observed that the reversible capacity of $Li_{3-x}Cu_xN$ and that of $Li_{3-x}Co_xN$ (both in a 25% by weight of NGPs) reaches 720 mAh/g and 610 mAh/g, respectively. In contrast, the reversible capacities of the two nitrides, when used alone (but bonded with 5% PVDF binder), were approximately 650 mAh/g and 560 mAh/g, respectively. It is of interest to note again that the theoretical capacity of an ideal graphite material is 372 mAh/g and the actual reversible capacities of most of the graphite materials are much lower than 320 mAh/g. This observation demonstrates that a combination of a lithium-transition metal nitride and NGPs provides an unexpected, synergistic effect on the reversible capacity of a lithium ion battery.

An amorphous carbon phase may be added to the active material-NGP composite material in the following manner: The composite may be mixed with a resin to form a composite mixture. This composite mixture may be heated to a temperature of typically 500-1,000° C. for a sufficient period of time to convert the resin into a polymeric carbon or an amorphous carbon phase. Hence, in the presently invented negative electrode material composition, the composite material may further comprise an amorphous carbon phase or polymeric carbon, wherein the electrochemically active particles or coating may be bonded by an amorphous carbon phase or polymeric carbon. Alternatively, the amorphous carbon phase may be obtained from chemical vapor deposition (CVD), chemical vapor infiltration (CVI), or pyrolyzation of an organic precursor. CVD or CVI techniques are well-known in the art and have been utilized to cover a graphite material with an amorphous coating.

Further alternatively, the electrochemically active material, if in fine powder form, may be further bonded by a binder material. An electrically conductive binder material may be selected from coal tar pitch, petroleum pitch, meso-phase pitch, coke, a pyrolyzed version of pitch or coke, or a conjugate chain polymer (intrinsically conductive polymer such as polythiophene, polypyrrole, or polyaniline. Alternatively, the particles may be bonded by a non-conductive material, such as polyvinylidene fluoride (PVDF) or PTFE, to form an integral anode member.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .ganmma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps (centipoises) or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

EXAMPLES

In the examples discussed below, unless otherwise noted, raw materials such as silicon, germanium, bismuth, antimony, zinc, iron, nickel, titanium, cobalt, and tin were obtained from either Alfa Aesar of Ward Hill, Mass., Aldrich Chemical Company of Milwaukee, Wis. or Alcan Metal Powders of Berkeley, Calif. X-ray diffraction patterns were collected using a Siemens diffractometer equipped with a copper target x-ray tube and a diffracted beam monochromator. The presence or absence of characteristic patterns of peaks was observed for each of the alloy samples studied. For example, a phase was considered to be amorphous when the X-ray diffraction pattern was absent or lacked sharp, well-defined peaks. The grain sizes of the crystalline phases were determined by the Scherer equation. When the grain size was calculated to be less than 50 nanometers, the phase was considered to be nanocrystalline. In several cases, scanning electron microscopy (SEM) and transmission electron microscopy (TEM) were used to characterize the structure and morphology of the hybrid material samples.

In Comparative Examples 1-7, each of the electrochemically active materials alone (without being hosted by NGPs) was formed into an electrode and characterized in an electrochemical cell. In addition, in Examples 1-7, the corresponding composite material was also separately incorporated into a lithium ion battery as an anode. Specifically, the powder particles obtained in the Comparative Samples were separately mixed with, as a binder, 2.2% by weight of styrene/butadiene rubber and 1.1% by weight of carboxylmethyl cellulose to obtain a mixture (a precursor to an anode active material), which was then coated on a copper foil to be employed as a collector. After being dried, the powder/resin mixture-copper foil configuration was hot-pressed to obtain a negative electrode. In some cases, PVDF particles were used as a binder material. Powder particles may also be bonded by an electronically conductive polymer. For instance, polyaniline-maleic acid-dodecyl hydrogensulfate salt may be synthesized directly via emulsion polymerization pathway using benzoyl peroxide oxidant, sodium dodecyl sulfate surfactant, and maleic acid as dopants. Dry polyaniline-based powder may be dissolved in DMF up to 2% w/v to form a solution.

Unless otherwise noted, the cathode of a lithium ion battery was prepared in the following way. First, 91% by weight of lithium cobalt oxide powder $LiCoO_2$, 3.5% by weight of acetylene black, 3.5% by weight of graphite, and 2% by weight of ethylene-propylene-diene monomer powder were mixed together with toluene to obtain a mixture. The mixture was then coated on an aluminum foil (30 µm) serving as a current collector. The resulting two-layer aluminum foil-active material configuration was then hot-pressed to obtain a positive electrode.

A positive electrode, a separator composed of a porous polyethylene film, and a negative electrode was stacked in this order. The stacked body was spirally wound with a separator layer being disposed at the outermost side to obtain an electrode assembly as schematically shown in FIG. 1. Hexafluorolithium phosphate ($LiPF_6$) was dissolved in a mixed solvent consisting of ethylene carbonate (EC) and methylethyl carbonate (MEC) (volume ratio: 50:50) to obtain a non-aqueous electrolyte, the concentration of $LiPF_6$ being 1.0 mol/l (solvent). The electrode assembly and the nonaqueous electrolyte were placed in a bottomed cylindrical case made of stainless steel, thereby obtaining a cylindrical lithium secondary battery.

Unless otherwise specified, in order to compare the electrochemical behaviors of composite anode materials prepared in Examples 1-7, we used a method analogous to that used by Wu, et al. [Y. P. Wu, C. Jiang, C. Wan and E. Tsuchida, "A Green Method for the Preparation of Anode Materials for Lithium Ion Batteries," J. Materials Chem., 11 (2001) 1233-1236] to characterize the charge and discharge behaviors of corresponding lithium ion batteries.

Example 1

Samples 1a, 1b and Comparative Samples 1a, 1b

Natural flake graphite, nominally sized at 45 µm, provided by Asbury Carbons (405 Old Main St., Asbury, N.J. 08802, USA) was milled to reduce the size to approximately 14 µm (Sample 1). The chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite (20 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite sample. The dried, expandable graphite was quickly placed in a tube furnace preheated to 1,000° C. and allowed to stay inside a quartz tube for approximately 40 seconds to obtain exfoliated graphite worms. The worms were then subjected to an ultrasonication treatment (80 W for one hour) for flake break-up and separation of graphene sheets to obtain NGPs. A Branson S450 Ultrasonicator was used.

Sample 1a: Approximately 5 grams of the NGPs thus prepared were mixed with 25 grams of $SnCl_2$ in a glass flask under nitrogen environment. The mixture was heated at 370° C. for approximately 10 hours. The product was rinsed in distilled water for one minute and then dried in ambient air for one hour. The dried product was post-heated at 1,000° C. for one hour, resulting in a product that is composed of approximately 55% by weight Sn nanoparticles disposed in pores of the graphite worms.

Comparative Sample 1a: Sn nano particles were prepared in a similar manner without the presence of NGPs. These particles were bonded by a binder material (2.2% by weight of styrenelbutadiene rubber and 1.1% by weight of carboxylmethyl cellulose) in the preparation of an anode member. NGPs with a binder material but without the Sn particles, were also made by re-compression into a baseline anode material.

Figure 3:
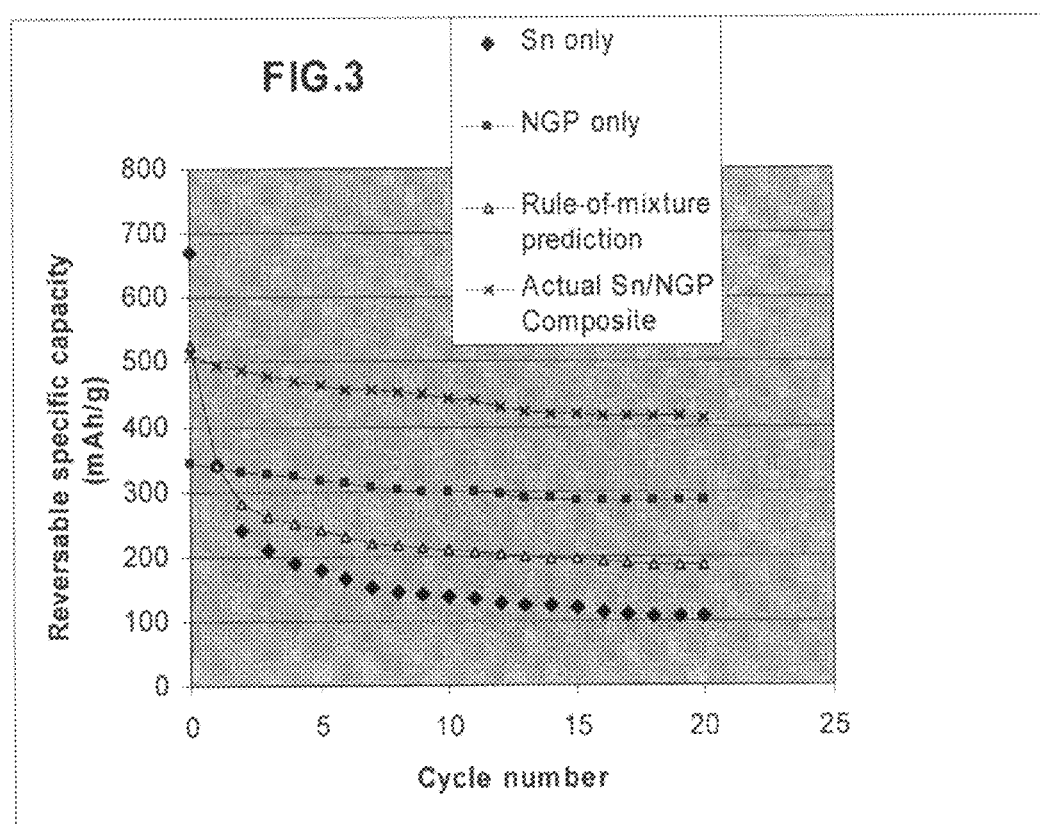
FIG. 3 Specific capacities of various anode materials: Sn-only, NGPs-only, theoretical model (based on a rule-of-mixture law), and Sn+NGPs.

The reversible capacities of Sample 1a, Comparative Sample 1a, a baseline NGP anode sample, and a theoretically predicted model (based on a rule-of-mixture law) are shown in FIG. 3. The prediction was based on the assumption of no synergistic effect between the two electrochemically active materials (Sn and NGPs) according to the following equation: $C_{hybrid} = f_{Sn}C_{Sn} + f_{NGP}C_{NGP}$, where $C_{hybrid}$ is the predicted specific capacity of the hybrid material, $f_{Sn}$ and $f_{NGP}$ are the weight fractions of the Sn particles and the NGP, respectively, and $C_{Sn}$ and $C_{NGP}$ are the specific capacities of the Sn particles alone and the NGPs alone, respectively. It is clear that the Sn particles, when hosted by the NGPs, provide a synergistic effect on the specific capacity, which is far superior to what could be achieved by either component alone. This is a highly surprising and impressive result.

Sample 1b: About 5 grams of Si powder were put in a tungsten heating boat. Approximately 5 grams of NGPs supported by a quartz plate of 30 cm×5 cm and the Si-loaded tungsten boat were mounted in a vacuum chamber, which was evacuated to and maintained at a pressure of $10^{-7}$ torr for 3 hours at room temperature. An electric current was passed directly on the tungsten boat to heat the loaded Si up to slightly above its melting point. The evaporation was controlled by monitoring the deposited thickness with a quartz crystal microbalance mounted near the graphite worm plate. The deposition rate was controlled to be about 2 Å/min. The resulting product was a hybrid material containing a Si thin film coating on NGPs. Weight measurements before and after Si vapor deposition indicated that the composite material was composed of 23% by weight Si and 77% by weight NGPs.

Comparative Sample 1b: The Si thin film was coated onto a surface of a 30 µm thick Ni foil and the resulting Si-coated Ni foil was used as an anode in a lithium ion battery. The Si-coated foil was cut into 1 cm×1 cm squares with a Ni lead wire spot-welded thereon. The electrolyte used was 1 M $LiClO_4$ dissolved in propylene carbonate (PC). A Pyrex cylindrical cell with three electrodes was used to evaluate constant-current charge-discharge cycling behaviors, wherein pure metallic Li foils were used as the reference and counter electrodes.

Figure 4:
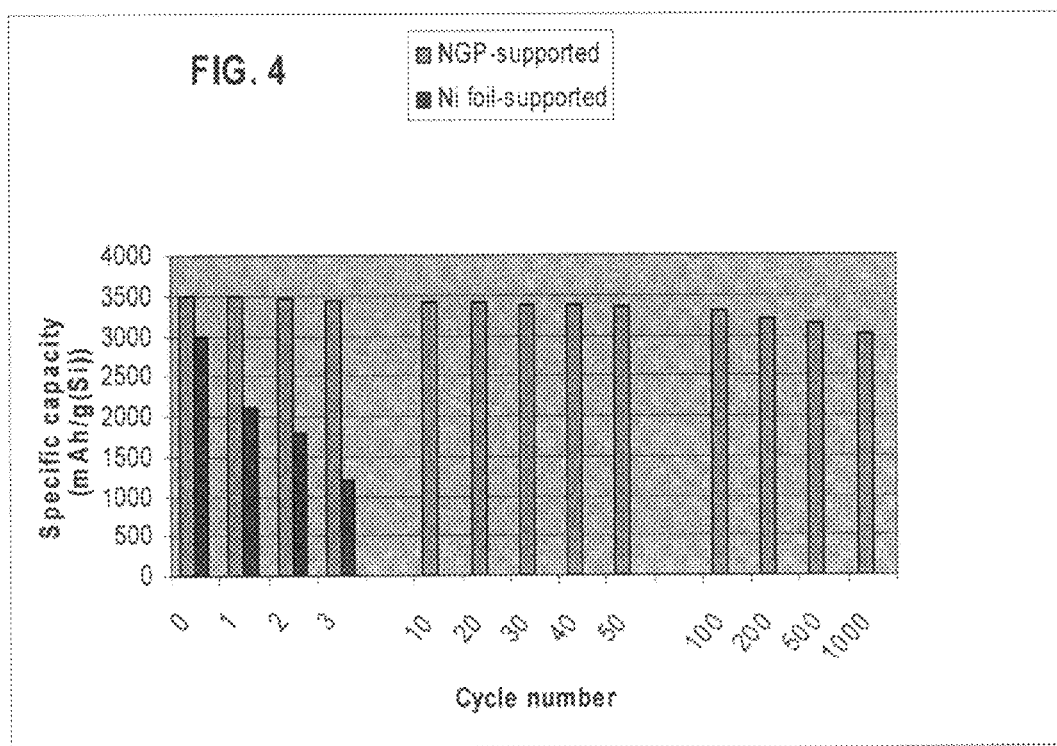
FIG. 4 Specific capacities of Si thin film anode supported on NGPs and a baseline Si thin film anode supported on a Ni foil, respectively.

The data in FIG. 4 show that a dramatic loss in specific capacity occurred to the Ni-supported Si film sample. However, even after 1000 cycles, the NGP-supported Si film still maintains an exceptionally high specific capacity. In both cases, the specific capacity was calculated based on the Si weight only; the host or support weight was not counted. SEM examinations indicate that the Si film supported on Ni foil exhibited fragmentation and delamination (away from the support layer) after the first cycle. This degradation phenomenon was not observed with the NGP-supported Si film.

Example 2

Samples 2a-2e and Comparative Samples 2a-2e

NGPs for Samples 2a, 2b, 2c, 2d, and 2e were prepared according to the same procedure used for Sample 1, but the starting graphite materials were highly oriented pyrolytic graphite (HOPG), graphite fiber (Amoco P-100 graphitized carbon fiber), graphitic carbon nano-fiber (Pyrograph-III from Applied Science, Inc., Cedaville, Ohio), spheroidal graphite (HuaDong Graphite, QinDao, China), and mesocarbon micro-beads (MCMBs) (MCMB 2528, Osaka Gas Company, Japan), respectively. These four types of laminar graphite materials were intercalated, exfoliated, and separated to obtain NGPs under similar conditions as in Sample 1.

The corresponding electrochemically active particles for these samples include materials derived from metal oxides of the type MO or $MO_2$, where M=Sn, Pb, Ge, Si, or Cd. The active materials may be prepared according to the following steps: (1) stanous oxide (SnO) powder and lithium nitride ($Li_3N$) powder were mixed in a stoichiometric ratio of two moles of $Li_3N$ to three moles of SnO; (2) the mixture of powders from step (1) was fed into a planetary ball mill (Model PM-400 from Glen Mills, Clifton, N.J.), and the milling was proceeded until the SnO and $Li_3N$ reached a state characterized by complete disappearance of the X-ray diffraction patterns for crystalline SnO and $Li_3N$, and the subsequent appearance of the X-ray patterns for amorphous $Li_2O$ and crystalline Sn. The ball milling process typically lasts for one to two days at ambient temperature; and (3) The milled powder was then blended with NGPs obtained in Sample 2a (i.e., from the HOPG) and the resulting powder mixture was press-rolled to form an anode layer of approximately 200 μm. The layer is composed of approximately 72% by weight of the $Li_2O$—Sn mixture and 72% by weight of NGPs. The Comparative Sample 2a was prepared from the $Li_2O$—Sn mixture powder bonded with approximately 5% resin binder.

Samples 2b-2e were obtained from Pb, Ge, Si, and Cd, respectively as an electrochemically active material used in combination with NGPs from the graphite fiber, graphitic carbon nano-fiber (GNF), spheroidal graphite (SG), and MCMB, respectively.

Comparative Samples 2a-2e were obtained from similarly made powder mixtures, which were not hosted by NGPs, but instead only bonded by a resin binder in the preparation of an anode.

Figure 5:
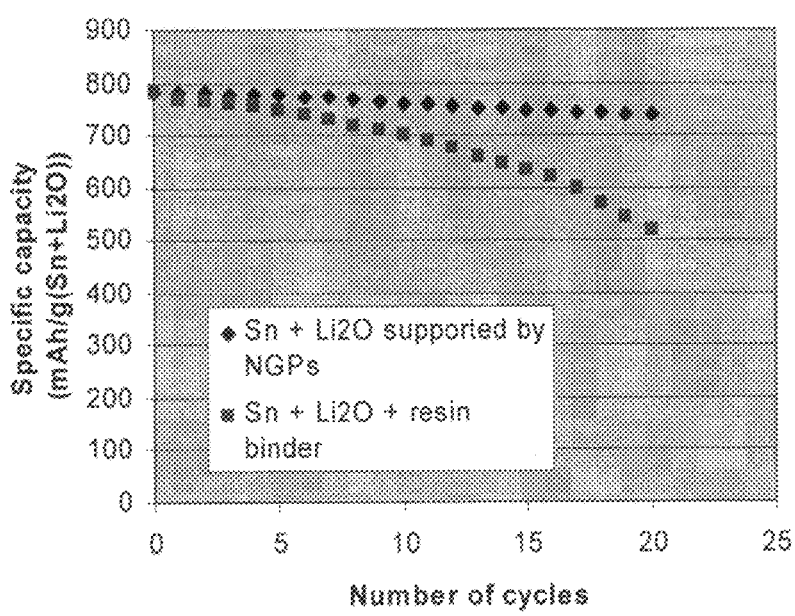
FIG. 5 Specific capacities of a (Sn+$Li_2O$) mixture bonded by a resin binder and that supported by NGPs, respectively.

The specific capacity data for Sample 2a and Comparative Sample 2a, summarized in FIG. 5, clearly show that the NGP-hosted mixture of Sn and $Li_2O$ has a better cycling response than the corresponding resin binder-bonded material. By defining the extent of irreversibility=(initial discharge capacity−discharge capacity after N cycles)/(initial discharge capacity), Sample 2a and Comparative sample 2a exhibit an extent of capacity (N=20) of 4.3% and 33.3%, respectively. The extents of irreversibility of Samples 2b, 2c, 2d, and 2e are 5.8%, 5.1%, 6.1%, and 4.6%, respectively. In contrast, the extents of irreversibility of Comparative Samples 2b, 2c, 2d, and 2e are 25.6%, 26.2%, 27.3%, and 25.6%, respectively.

Example 3

Samples 3a-3c and Comparative Samples 3a-3c

Additional graphite intercalation compound (GIC) was prepared by intercalation and oxidation of natural graphite flakes (original size of 200 mesh, from Huadong Graphite Co., Pingdu, China, milled to approximately 15 μm, referred to as Sample 3a) with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately one hour at 30° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The resulting GIC was exposed to a temperature of 1,050° C. for 35 seconds in a quartz tube filled with nitrogen gas to obtain worms of exfoliated graphite flakes. The worms were then subjected to an ultrasonication treatment (85 W for one hour) for flake break-up and separation of graphene sheets to obtain NGPs.

The electrochemically active particles in these examples are $Si_xSn_qM_yC_z$ type compositions with $(q+x)>(2y+z)$, $x>0$, and M is one or more metals selected from manganese, molybdenum, niobium, tungsten, tantalum, iron, copper, titanium, vanadium, chromium, nickel, cobalt, zirconium, yttrium, or combinations thereof, wherein the Si, Sn, M, and C elements are arranged in the form of a multi-phase microstructure comprising at least one amorphous or nanocrystalline phase. As an example, Sample 3a was prepared by ball-milling silicon chips, cobalt powder, and graphite powder with 28 tungsten carbide balls (5/16-inches each, approximately 108 grams) for 4 hours in a 45 milliliter tungsten carbide vessel using a planetary ball mill (Model PM-400 from Glen Mills, Clifton, N.J.) under an argon atmosphere. The vessel was then opened, chunks of caked powder were broken up, and the milling was continued for an additional hour in an argon atmosphere. The temperature of the tungsten carbide vessel was maintained at about 30° C. by air cooling. The product was determined to be approximately $Si_{73}CO_{23}C_4$.

Samples 3b and 3c were prepared by the same general procedure as Sample 3a with the following differences. Silicon powder (325 mesh), tin powder (<10 microns), and Co or Ni metal powders (Cobalt, 1.6 microns; Nickel, Alcan Metal Powder, Type 123) were used. Samples 3b and 3c were milled with 14 tungsten carbide balls (0.415 mm diameter; approximately 54 grams total weight) in the ball mill for 16 hours in an argon atmosphere. The resulting products were $Si_{74}Sn_2CO_{24}$ and $Si_{73}Sn_2Ni_{25}$, respectively.

For Samples 3a-3c, the fine powder products prepared after ball milling were separately mixed with NGPs, plus 2% by weight of a resin binder, and then cold-compressed with a hydraulic press at 100 psig to prepare an anode sheet of approximately 200 μm in thickness. For Comparative Samples 3a-3c, the fine powder products were not hosted by NGPs, but instead only bonded by a resin binder in the preparation of an anode. The reversible capacities of Samples 3a, 3b, and 3c after 40 cycles were 1,160, 1222, 1213 mAh/g, respectively. In contrast, the reversible capacities of Comparative Samples 3a, 3b, and 3c after only 10 cycles were 782, 740, 892 mAh/g, respectively. Theses classes of materials were characterized as having primarily amorphous and nanocrystalline phases, which were believed to be less prone to volume change-induced particle fragmentation or loss of particle-to-particle or particle-to-current collector contact. Our data have clearly shown that even these types of electrochemically active materials can be further protected by the NGP host.

Example 4

Sample 4a, 4b and Comparative Samples 4a, 4b

Five grams of NGPs prepared in Example 3 were used in the preparation of Sample 4a, 4b. The electrochemically active powders were prepared by mixing $Li_3N$ with stoichiometric amounts of a transition metal, such as Cu and Co, respectively. The powder mixtures were separately sealed in containers of a planetary ball mill, which was operated for two days to obtain nitrides, such as $Li_{3-x}Cu_xN$ and $Li_{3-x}Co_xN$. We observed that the reversible capacity of $Li_{3-x}Cu_xN$ (e.g. x=0.4) and that of $Li_{3-x}Co_xN$ (e.g., x=0.3), both hosted by a 25% by weight of NGPs, reached 732 mAh/g and 612 mAh/g, respectively when the cell was operated under a constant current density of 0.5 mA/cm² in the voltage range of 0-1.4 V, using Li metal as a reference electrode. In contrast, the reversible capacities of the two nitrides, when used alone (but bonded with 5% PVDF binder), were approximately 650 mAh/g and 560 mAh/g, respectively.

Example 5

Samples 5a and Comparative Samples 5a

The same batch of NGPs prepared in Example 3 was used in Example 5.

Sample 5a: Nano-crystalline Si with an average particle size of 80 nm was produced in our laboratory using a twin-arc evaporation technique. Carbon-coated Si was prepared by a thermal vapor decomposition (TVD) technique. The nano powder was supported on a quartz plate positioned inside a reaction tube. Benzene vapor and nitrogen gas were fed into the reaction tube (1,000° C.) at flow rates of 2 mL/min and 1 L/min, respectively. At such a high temperature, the organic vapor decomposed and carbon deposited onto the surface of Si particles. The mean particle size of the carbon-coated silicon was found to be approximately 84 nm (approximately 13% by weight carbon). Carbon-coated Si particles were dry-blended with to produce a composite material designated as Sample 5a. The corresponding anode material bonded by a resin binder, without the presence of the NGP, is designated as Comparative Sample 5a.

It may be noted that carbon-coated Si has been investigated as a potential lithium ion battery material, for instance, by a research group at Kyoto University: T. Umeno, et al., "Novel Anode Materials for Lithium-Ion Batteries: Carbon-Coated Silicon Prepared by Thermal Vapor Decomposition," Chemistry Letters (2001) 1186-1187 and M. Yoshio, et al., "Carbon-Coated Si as a Lithium-Ion Battery Anode Material," Journal of the Electrochemical Society, 149 (12) (2002) A1598-A1603. They have shown "the excellent electrochemical performance of carbon-coated Si as anode materials for lithium-ion batteries in terms of high reversible capacity over 800 mAh/g, high coulombic efficiency, good cyclability, satisfactory compatibility with both the EC and PC-based electrolytes, and better thermal stability than that of graphite, etc." They believed that carbon-coating in the outer layer played a very important role in the improvement of the electrochemical behavior by not only suppressing the decomposition of electrolytes on the surface of Si-based electrodes, but also providing integral and continuous electric contact networks around Si particles even they are a little expanded after lithium insertion. However, these researchers have indicated that "If the lithiation capacity of carbon-coated Si is controlled under 1,200 mAh/g, satisfactory cycleability can be obtained." [T. Umeno, et al. 2001]

By increasing the lithiation capacity to approximately 3,100 mAh/g (per gram of Si, corresponding to an alloy of $Li_{3.25}Si$), we have found that the cycleability of even carbon-coated Si particles was not satisfactory likely due to a large volume change. However, by adding approximately 20% by weight of NGPs, we were able to significantly improve the cycleability. Shown in FIG. 6 are four data series on specific capacity: Series 1 (denoted by ♦) is for C-coated Si particles bonded by a resin binder with specific capacity calculated on the basis of per gram of Si (carbon weight not counted); Series 2 (denoted by ■) is for C-coated Si particles hosted by 20% by weight of NGPs with specific capacity calculated on the basis of per gram of Si (carbon and NGP weights not counted); Series 3 (denoted by x) is for C-coated Si particles bonded by a resin binder with specific capacity calculated on the basis of per gram of (Si+C); and Series 4 (denoted by Δ) is for C-coated Si particles hosted by 20% by weight of NGPs with specific capacity calculated on the basis of per gram of (Si+C+NGP). A comparison between Series 1 and Series 2 data indicates that the NGP host enables the carbon-coated Si particles to provide a much better cycling performance. Furthermore, a comparison between Series 3 and Series 4 data indicates that, even after the additional NGP weight is taken into consideration, the C-coated Si hosted by the NGP provides a higher absolute specific capacity than the carbon-coated Si particles without an NGP host after 7 charge-discharge cycles.

Example 6

Samples 6a-6f and Comparative Samples 6a-6f

The same batch of NGPs prepared in Example 3 was used in Example 6.

Sample 6a: Nano-SnSb alloy was deposited on the surfaces of (NGPs+CNFs) at a weight ratio of 3:7. Between NGPs and CNFs, we had 80% by weight of NGP particles +20% by weight of CNF (Applied Sciences, Inc.). CNFs were added to impart additional mechanical integraity to the anode (without adding a resin binder). In brief, $SbCl_3$ and $SnCl_2.H_2O$ (99%) were mixed together with a molar ratio of 5:4 and dissolved in glycerin to form a 0.5 M solution. Then, NGP+CNF particles were added to the solution. The mixed solution or suspension was cooled down to 0.0 to 1.0° C. Zn powder (99.9%) with 95% stoichiometric amount was added to the solution gradually and stirred simultaneously. Finally, after washing by ethanol and filtering, the product was dried under vacuum at 55° C.

For Comparative Samples 6a, nano-SnSb particles, without NGPs/CNFs, were prepared in a similar manner. The fine powder products were not hosted by NGPs, but instead just bonded by a resin binder in the preparation of an anode. The extent of irreversibility of Samples 6a was found to be 5.2% and, in contrast, the extent of irreversibility of Comparative Samples 6a was 21.5% after 100 cycles.

Sample 6b: Sn nano particles were prepared by a reduction method in glycerin solution at low temperature, $SbCl_3$ was dissolved in glycerin to form a 0.5 M solution. Then, NGPs were added to the solution to form a suspension. The suspension was cooled to 0.0 to 1.0° C. Subsequently, Zn powder with a 95% stoichiometric amount was slowly added to the solution while being stirred. Finally, after washing with ethanol and filtering, the black product was dried under vacuum at 50° C. The product was a composite material containing Sn nano particles well mixed with NGPs, which were then compressed.

For Comparative Samples 6b, nano-SnSb particles, without NGPs, were prepared in a similar manner. The fine powder products were not hosted by NGPs, but instead just bonded by a resin binder in the preparation of an anode. The extent of irreversibility of Samples 6a was found to be 5.5% and, in contrast, the extent of irreversibility of Comparative Samples 6a was 25.5% after 100 cycles.

Sample 6c: The Ni—Sn—P/graphene composite material was prepared by an electroless plating method in an aqueous solution. First, $SnSO_4$ (99%), $NiSO_4.6H_2O$ (98%), and $NaH_2PO_2.H_2O$ (95%) in stoichiometric amounts were dissolved in an aqueous solution as the metal precursors after stirring at room temperature. NGP particles were then rapidly added to the metal-precursor solution, and the solution was under continuous stirring at 80° C. for 40 min. A sodium succinate solution was applied as the buffer to adjust the pH value. The products were washed with distilled water and filtered until the pH of the filtrate was identical to that of the distilled water. The products were then dried at room temperature in vacuum. The NGP content was approximately 33% by weight for Sample 6c. To understand the effect of NGP content, additional samples (Comparative Samples 6c-I to 6c-III) were prepared that contained approximately 10%, 5%, and 2% by weight, respectively. The extents of irreversibility of Samples 6c, and Comparative Samples 6c-I, 6c-II, and 6c-III were found to be 4.9%, 4.8%, 4.9%, and 21.3%, respectively. This implies that a minimum NGP amount of 2% (preferably at least 5%) is required to achieve an effective cushioning or protective effect.

Sample 6d: The starting materials for preparation of SnS nanoparticles included tin (II) chloride ($SnCl_2.2H_2O$), sodium sulfide hydrate ($Na_2S\ 9H_2O$), and ethylene glycol ($C_2H_6O_2$). In a typical procedure, 1.07 g sodium sulfide hydrate and 1.0 g tin (II) chloride were separately dissolved in an adequate amount of ethylene glycol by magnetic stirring. Then the tin (II) chloride solution was added into the sodium sulfide hydrate solution drop by drop with slow stirring. Upon dropping, the solution gradually turned from translucent to dark, indicating the formation of SnS particles. All operations above were, conducted at higher than 60° C. NGP particles were then added to the reacting solution. After complete mixing, the obtained solution was thermostated at 150° C. for 24 h. Finally, brown black SnS/NGP particles were collected by centrifugation, washed with de-ionized water and dried at 80° C. for 1 day.

For Comparative Samples 6d, nano-SnS particles, without NGPs, were prepared in a similar manner. The fine powder products were not hosted by NGPs, but instead just bonded by a resin binder in the preparation of an anode. The extent of irreversibility of Samples 6d was found to be 5.6 and, in contrast, the extent of irreversibility of Comparative Samples 6d was 22.5% after 100 cycles.

Sample 6e: For the synthesis of carbon aerogel, resorcinol ($C_6H_6O_2$), formaldehyde ($CH_6O$) and $NH_3H_2O$ were used. Resorcinol and formaldehyde with a mole ratio of 1:2 were put into de-ionized water and agitated. Then, $NH_{13}H_2O$ was added to the resulting solution to adjust the pH value to 6.5. Afterwards, the resorcinol-formaldehyde solution was placed in thermostated container at 85° C. When the solution became viscous and appeared orange-like in color, the as-prepared SnS particles (same as in Sample 6d) were mixed with the resorcinol-formaldehyde sol and magnetic stirred for several minutes. Then, the viscous sol was mixed with NGPs and the resulting fluid was placed in a thermostated container at 85° C. for 24 h to obtain SnS dispersed resorcinol-formaldehyde gel film coated on graphene platelet surfaces. The synthesized gel film was carbonized at 650° C. for 1.5 h under nitrogen. The content of SnS in the SnS/C composite film is 72 wt %, determined from the weight loss before and after carbonization. Comparative Sample 6e was similarly prepared without using NGPs. The extent of irreversibility of Samples 6a was found to be 64 after 500 cycles and, in contrast, the extent of irreversibility of Comparative Samples 6a was 25.5% after just 100 cycles.

Sample 6f: The spray pyrolysis technique was applied to synthesize in situ a series of $SnO_2$-carbon nano-composites at 700° C. The in situ spray pyrolysis process ensures that the chemical reaction is completed during a short period of time, preventing the crystals from growing too large. A solution of $SnCl_2.2H_2O$ and sucrose was used as a spray precursor. The spray precursors were prepared by mixing saturated aqueous sucrose solutions with tin (II) chloride dehydrate (Aldrich, 98%) 1 M ethanol solution, in $SnCl_2.2H_2O$/sucrose in weight ratios of 100:0, 60:40, 40:60, and 10:90, respectively. The $SnO_2$ pure sample and $SnO_2$-carbon composites were obtained in situ using a vertical type of spray pyrolysis reactor at 700° C. The process resulted in super fine nanocrystalline $SnO_2$, which was distributed homogeneously inside the amorphous carbon matrix. The C—$SnO_2$ composite particles were dry-blended with approximately 23% NGP particles and then slightly compressed to obtain Sample 6f. The anode material without NGPs was denoted as Comparative Sample 6f. The extent of irreversibility of Samples 6f was found to be 6.7 and, in contrast, the extent of irreversibility of Comparative Samples 6f was 27.5% after 100 cycles.

Example 7

Samples 7a, 7b and Comparative Samples 7a, 7b

Nanostructured $CO_3O_4C$ and $CO_3O_4$ powders were prepared in separate experiments using a vertical spray pyrolysis apparatus. The $CO_3O_4$ powders was obtained by spraying aqueous 0.2 M cobalt nitrate solutions at ambient temperature through an ultrasonic nozzle at 3 mL/min into an open air 2 m quartz tube at 600° C. For the preparation of the $Co_3O_4$—C powder, the precursor solution contained 0.05 M sucrose and 0.2 M cobalt nitrate. The experimental conditions for pyrolysis of this solution were identical to those described for $CO_3O_4$ powder. The compositions of all final powder products were confirmed by X-ray diffraction (XRD). The $CO_3O_4$—C and $CO_3O_4$ powders were separately dried blended with NGPs to obtain Samples 7a and 7b, respectively. The corresponding anodes, without NGPs but with a resin binder are denoted as Comparative Samples 7a and 7b, respectively. The extent of irreversibility of Samples 7a was found to be 6.3%, and, in contrast, the extent of irreversibility of Comparative Samples 6a was 24.8% after 100 cycles. The extent of irreversibility of Samples 7b was found to be 6.4% and, in contrast, the extent of irreversibility of Comparative Samples 6a was 27.3% after 100 cycles.

In summary, the present invention provides an innovative, versatile platform materials technology that enables the design and manufacture of superior anode materials for lithium ion batteries or other types of rechargeable batteries. This new technology appears to have the following advantages:

(1) This approach is applicable to a wide spectrum of electrochemically active materials, particularly those more rigid materials or materials that undergo a large volume change during absorption (or intercalation) and desorption (or extraction) of lithium ions.

(2) The invented hybrid anode exhibits a reversible capacity much higher than that of graphite (372 mAh/g) and a low irreversible capacity loss.

(3) It seems that NGPs, being mechanically flexible, are capable of accommodating or cushioning the strains or stresses induced by volume changes during lithium insertion and extraction.

(4) With the active material particle size or coating thickness being small (<200 μm, preferably less than 1 μm) and with NGP length/width being small (preferably <5 μm), the distance for lithium ions to travel is reduced. The anode can quickly store or release lithium and thus can carry high current. This is a highly beneficial feature for a battery that is intended for high power density applications such as electric cars.

(5) The NGPs also serve to separate or isolate active material particles from one another, preventing coalescence or sintering of fine particles. Furthermore, with a sufficient amount of NGPs that reach a state of percolation, the highly conductive platelets form a continuous path for electrons, resulting in significantly reduced internal energy loss or internal heating.

The invention claimed is:

1. A nano-scaled graphene platelet-based composite composition for use as a lithium ion battery anode, said composition comprising:
   a) micron- or nanometer-scaled particles or coating which are capable of absorbing and desorbing lithium ions; and
   b) a plurality of separated or isolated nano-scaled graphene platelets (NGPs), wherein a platelet comprises a graphene sheet or a stack of graphene sheets having a platelet thickness less than 100 nm; wherein at least one of said particles or coating is physically attached or chemically bonded to at least one of said platelets and the amount of platelets is in the range of 2% to 90% by weight and the amount of particles or coating is in the range of 98% to 10% by weight;
   wherein the particles or coating comprises an active material capable of absorbing or extracting lithium ions and said active material is selected from the group consisting of:
   (a) silicon (Si), germanium (Ge), tin (Sn), lead (Pb), antimony (Sb), bismuth (Bi), zinc (Zn), aluminum (Al), and cadmium (Cd);
   (b) alloys or intermetallic compounds of Si, Ge, Sn, Pb, Sb, Bi, Zn, Al, or Cd with other elements, wherein said alloys or compounds are stoichiometric or non-stoichiometric;
   (c) oxides, carbides, nitrides, sulfides, phosphides, selenides, and tellurides of Si, Ge, Sn, Pb, Sb, Bi, Zn, Al, Fe, or Cd, and their mixtures or composites;
   (d) salts and hydroxides of Sn; and
   (e) combinations thereof.

2. The composite composition of claim 1 wherein said NGPs are obtained from exfoliation and separation of graphene sheets of a laminar graphite material selected from natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, graphitized polymeric carbon, or a combination thereof.

3. The composite composition as defined in claim 1 wherein said platelets have a specific surface area greater than about 100 m$^2$/gm or have an average thickness thinner than 10 nm.

4. The hybrid composition as defined in claim 1 wherein said platelets have a specific surface area greater than about 500 m$^2$/gm or have an average thickness thinner than 2 nm.

5. The composite composition as defined in claim 1 wherein said particles have a dimension less than 5 μm or said coating has a thickness less than 5 μm.

6. The composite composition as defined in claim 1, further comprising a conductive additive selected from carbon or graphitic nano-fiber, carbon nano-tube, carbon black, activated carbon powder, or a combination thereof.

7. The composite composition as defined in claim 1 wherein the particles or coating comprise Sn or Si as a primary element with Si or Sn content no less than 20% by weight based on the total weight of the particles or coating and nano-scaled graphene platelets.

8. The composite composition as defined in claim 1 wherein the particles comprise an element selected from Si, Ge, Sn, Cd, Sb, Pb, Bi, or Zn.

9. The composite composition as defined in claim 1 wherein the particles or coating are amorphous or comprise nano crystallites.

10. The composite composition as defined in claim 1 further comprising an amorphous carbon, polymeric carbon, carbon black, coal tar pitch, petroleum pitch, or meso-phase pitch in physical contact with said particles or coating.

11. The composite composition as defined in claim 10 wherein said polymeric carbon is obtained from pyrolyzation of a polymer selected from the group consisting of phenol-formaldehyde, polyacrylonitrile, styrene-based polymers, cellulosic polymers, epoxy resins, and combinations thereof.

12. The composite composition of claim 10 wherein said amorphous carbon phase is obtained from chemical vapor deposition, chemical vapor infiltration, or pyrolyzation of an organic precursor.

13. A lithium secondary battery comprising a positive electrode, a negative electrode comprising a composite composition as defined in claim 1 which is capable of absorbing and desorbing lithium ions, and an electrolyte disposed between said negative electrode and said positive electrode.

14. The lithium secondary battery according to claim 13, wherein said positive electrode comprises lithium cobalt oxide, lithium nickel oxide, lithium manganese oxide, lithium iron phosphate, lithium vanadium phosphate, or a combination thereof.

15. The lithium secondary battery as defined in claim 13, wherein said composite composition further comprises a binder material selected from a polymer, coal tar pitch, petroleum pitch, meso-phase pitch, coke, or a derivative thereof.

16. The lithium secondary battery as defined in claim 13, wherein said composite composition provides a specific capacity of no less than 600 mAh per gram of the anode composition.

17. The lithium secondary battery as defined in claim 13, wherein said composite composition provides a specific capacity of no less than 1,000 mAh per gram of the anode composition.

* * * * *